US007305822B2

(12) United States Patent
Ouchida et al.

(10) Patent No.: US 7,305,822 B2
(45) Date of Patent: Dec. 11, 2007

(54) HYDRAULIC EQUIPMENT

(75) Inventors: Takeshi Ouchida, Osaka (JP); Shuji Shiozaki, Osaka (JP); Hidekazu Niu, Osaka (JP); Hiroshi Matsuyama, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 11/369,978

(22) Filed: Mar. 8, 2006

(65) Prior Publication Data

US 2006/0174617 A1 Aug. 10, 2006

Related U.S. Application Data

(63) Continuation of application No. PCT/JP04/06654, filed on May 18, 2004.

(30) Foreign Application Priority Data

Sep. 9, 2003 (JP) .............................. 2003-317071

(51) Int. Cl.
*F15B 31/02* (2006.01)
(52) U.S. Cl. ........................................................ 60/489
(58) Field of Classification Search .................. 60/489
See application file for complete search history.

(56) References Cited

U.S. PATENT DOCUMENTS 1,780,365 A   11/1930  Sherman
6,122,914 A *  9/2000  Hayashi et al. ............... 60/489

FOREIGN PATENT DOCUMENTS

DE      19527649 A1   1/1997
JP      11-82671 A    3/1999
JP      2002-31209 A  1/2002
JP      2003-14079 A  1/2003

OTHER PUBLICATIONS

Seizaburo Ashiba, "Kikai Undo Kiko," Kabushiki Kaisha Gihodo, Oct. 15, 1957, pp. 33, 175 (particularly, paragraph Nos. 152, 963).
Jones, Franklin D., Ingenious Mechanisms for Designers and Inventors Volume II, New York: The Industrial Press, 1951, 9th printing, pp. 51 to 53, Fig. 31 (particularly, Operating Two Slides in Opposite Directions with One Single-Groove Cam).

* cited by examiner

*Primary Examiner*—F. Daniel Lopez
(74) *Attorney, Agent, or Firm*—Sterne, Kessler, Goldstein & Fox P.L.L.C.

(57) ABSTRACT

The present invention relates to hydraulic equipment comprising input shaft (2) and output shaft; first and second plungers (8, 10) and first and second spool valves (9, 11) which are moved reciprocally axially; a cylinder block (7) which houses the plungers and spool valves and is rotated integrally with the input shaft; an input side swash plate (6) which touches the first plungers; and an output side swash plate (12) which touches the second plungers and is rotated integrally with the output shaft. The purpose of the present invention is to reduce number of parts concerning to the accuracy of the reciprocal movement of the first and second spool valves.

Spool valve guides (37 and 47) on which guide grooves (37b and 47b) slanted against axis of the rotary shaft are formed, and the first or second spool valve is engaged with a holding member (38 or 48) attached to the guide groove or the guide groove.

10 Claims, 22 Drawing Sheets

(a)

(b)

(a)

(b)

HYDRAULIC EQUIPMENT

BACKGROUND OF THE INVENTION

1. Field of the Invention

The present invention relates to hydraulic equipment or a power transmission device widely available in each of industrial fields, such as industrial equipment or a vehicle.

2. Background Art

Conventionally, there is well known an art of hydraulic equipment comprising a first rotary shaft and a second rotary shaft; first and second plungers which are moved reciprocally axially; first and second spool valves which are also moved reciprocally axially; a cylinder block which houses the first and second plungers and the first and second spool valves and is rotated integrally with the first rotary shaft; a first swash plate which touches the first plungers at a swash plate surface changeable its slant angle against the axis of the rotary shaft; and a second swash plate which touches the second plungers at a swash plate surface having the fixed slant angle against the axis of the rotary shaft and is rotated integrally with the second rotary shaft, wherein a hydraulic circuit is formed in the cylinder block so as to communicate holes in which the first plungers are housed with holes in which the second plungers are housed, and a passage of pressure oil flowing into or out from the plunger holes in which the input side plungers are housed is switched by the first spool valves, and a passage of pressure oil flowing into or out from the plunger holes in which the second plungers are housed is switched by the second spool valves. For example, such an art is disclosed in the Japanese Patent Laid Open Gazette 2003-14079.

With regard to the above-mentioned hydraulic equipment, one of important factors determining the driving characteristics (energy efficiency, noise, friction and the like) is the timing of switching an oil passage of hydraulic circuit in the cylinder block by the first spool valve (input side spool valve) and the second spool valve (output side spool valve). Accordingly, high accuracy is required of the control of reciprocal movement of the first and second spool valves, whereby high dimensional accuracy is required of the parts concerning to the reciprocal movement along the axial direction of the input shaft.

With regard to the hydraulic equipment disclosed in the Japanese Patent Laid Open Gazette 2003-14079, the spool valve is moved reciprocally along the axial direction of the input shaft by an engaging member (retainer) engaged with the spool valve provided in the cylinder block so as to switch passages of the hydraulic circuit. The engaging member is rotatably attached to a holder through a ball bearing, and the holder is supported by a side wall member (a member for pivotally supporting the input shaft and attaching the hydraulic equipment to a transmission casing or the like). Furthermore, a member for keeping distance between the side wall member and the cylinder block (sleeve) is provided. Accordingly, the number of parts concerning to the accuracy of the reciprocal movement of the spool valve is many, whereby it is difficult to keep the accuracy and the manufacturing cost is increased.

BRIEF SUMMARY OF THE INVENTION

According to the present invention, hydraulic equipment comprising a first rotary shaft and a second rotary shaft; first and second plungers which are moved reciprocally axially; first and second spool valves which are also moved reciprocally axially; a cylinder block which houses the first and second plungers and the first and second spool valves and is rotated integrally with the first rotary shaft; a first swash plate which touches the first plungers; and a second swash plate which touches the second plungers and is rotated integrally with the second rotary shaft, wherein a hydraulic circuit is formed in the cylinder block so as to communicate holes in which the first plungers are housed with holes in which the second plungers are housed, and a passage of pressure oil flowing into or out from the plunger holes in which the input side plungers are housed is switched by the first spool valves, and a passage of pressure oil flowing into or out from the plunger, holes in which the second plungers are housed is switched by the second spool valves, is characterized in that a spool valve guide on which a guide groove slanted against axis of the rotary shaft is formed, and the first or second spool valve is engaged with a holding member attached to the guide groove.

Accordingly, number of the members is reduced to which high dimensional accuracy is required for maintaining the accuracy of the axial reciprocal movement of the first and second spool valves, whereby the manufacturing cost is reduced.

According to the present invention, the spool valve guide and the cylinder block touch with each other by their surfaces facing mutually.

Accordingly, by processing the surfaces facing mutually with high accuracy, the accuracy of the axial reciprocal movement of the first or second spool valve can be obtained easily, whereby the members can be manufactured easily so as to reduce the manufacturing cost.

According to the present invention, a member is provided which is engaged with the spool valve guide in convexo-concave way from opposite side of the cylinder block.

Accordingly, the spool valve guide is applied thereto with power respectively toward the cylinder block. Therefore, by processing with high accuracy the surfaces by which the spool valve guide touch the cylinder block, the accuracy of the axial reciprocal movement of the first or spool valve can be maintained easily, whereby the members can be manufactured easily so as to reduce the manufacturing cost.

According to the present invention, first and second inner peripheral grooves formed on an inner peripheral surface of a through-hole bored on the cylinder block for the first rotary shaft; spool valve holes in which the first and second spool valves are housed; and a hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively on axial direction than a position at which the first or second inner peripheral groove is communicated with the spool valve hole, and the radial extended part at the middle portion of the first or second spool valve is arranged at the confluence part communicating the plunger hole with the spool valve hole.

Accordingly, oil pressure equally effects to the entire outer perimeter of the radial extended parts of the spool valve at the confluence part. Therefore, the spool valve is prevented from being pressed along a certain circumferential direction inside the spool valve hole. Furthermore, the confluence part can be formed by boring easily, whereby the manufacturing becomes easy.

According to the present invention, hydraulic equipment comprising a first rotary shaft and a second rotary shaft; first and second plungers which are moved reciprocally axially; first and second spool valves which are also moved reciprocally axially; a cylinder block which houses the first and second plungers and the first and second spool valves and is rotated integrally with the first rotary shaft; a first swash plate which touches the first plungers; and a second swash plate which touches the second plungers and is rotated integrally with the second rotary shaft, wherein a hydraulic circuit is formed in the cylinder block so as to communicate holes in which the first plungers are housed with holes in which the second plungers are housed, and a passage of pressure oil flowing into or out from the plunger holes in which the input side plungers are housed is switched by the first spool valves, and a passage of pressure oil flowing into or out from the plunger holes in which the second plungers are housed is switched by the second spool valves, is characterized in that a spool valve guide on which a guide groove displaced along an axial direction of the rotary shaft is formed is provided, and the first or second spool valve is engaged with the guide groove.

Accordingly, number of the members is reduced to which high dimensional accuracy is required for maintaining the accuracy of the axial reciprocal movement of the first and second spool valves, whereby the manufacturing cost is reduced.

According to the present invention, the spool valve guide and the cylinder block touch with each other by their surfaces facing mutually.

Accordingly, by processing the surfaces facing mutually with high accuracy, the accuracy of the axial reciprocal movement of the first or second spool valve can be obtained easily, whereby the members can be manufactured easily so as to reduce the manufacturing cost.

According to the present invention, a member is provided which is engaged with the spool valve guide in convexo-concave way from opposite side of the cylinder block.

Accordingly, the spool valve guide is applied thereto with power respectively toward the cylinder block. Therefore, by processing with high accuracy the surfaces by which the spool valve guide touch the cylinder block, the accuracy of the axial reciprocal movement of the first or spool valve can be maintained easily, whereby the members can be manufactured easily so as to reduce the manufacturing cost.

According to the present invention, first and second inner peripheral grooves formed on an inner peripheral surface of a through-hole bored on the cylinder block for the first rotary shaft; spool valve holes in which the first and second spool valves are housed; and a hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively on axial direction than a position at which the first or second inner peripheral groove is communicated with the spool valve hole, and the radial extended part at the middle portion of the first or second spool valve is arranged at the confluence part communicating the plunger hole with the spool valve hole.

Accordingly, oil pressure equally effects to the entire outer perimeter of the radial extended parts of the spool valve at the confluence part. Therefore, the spool valve is prevented from being pressed along a certain circumferential direction inside the spool valve hole. Furthermore, the confluence part can be formed by boring easily, whereby the manufacturing becomes easy.

DETAILED DESCRIPTION

Figure 1:
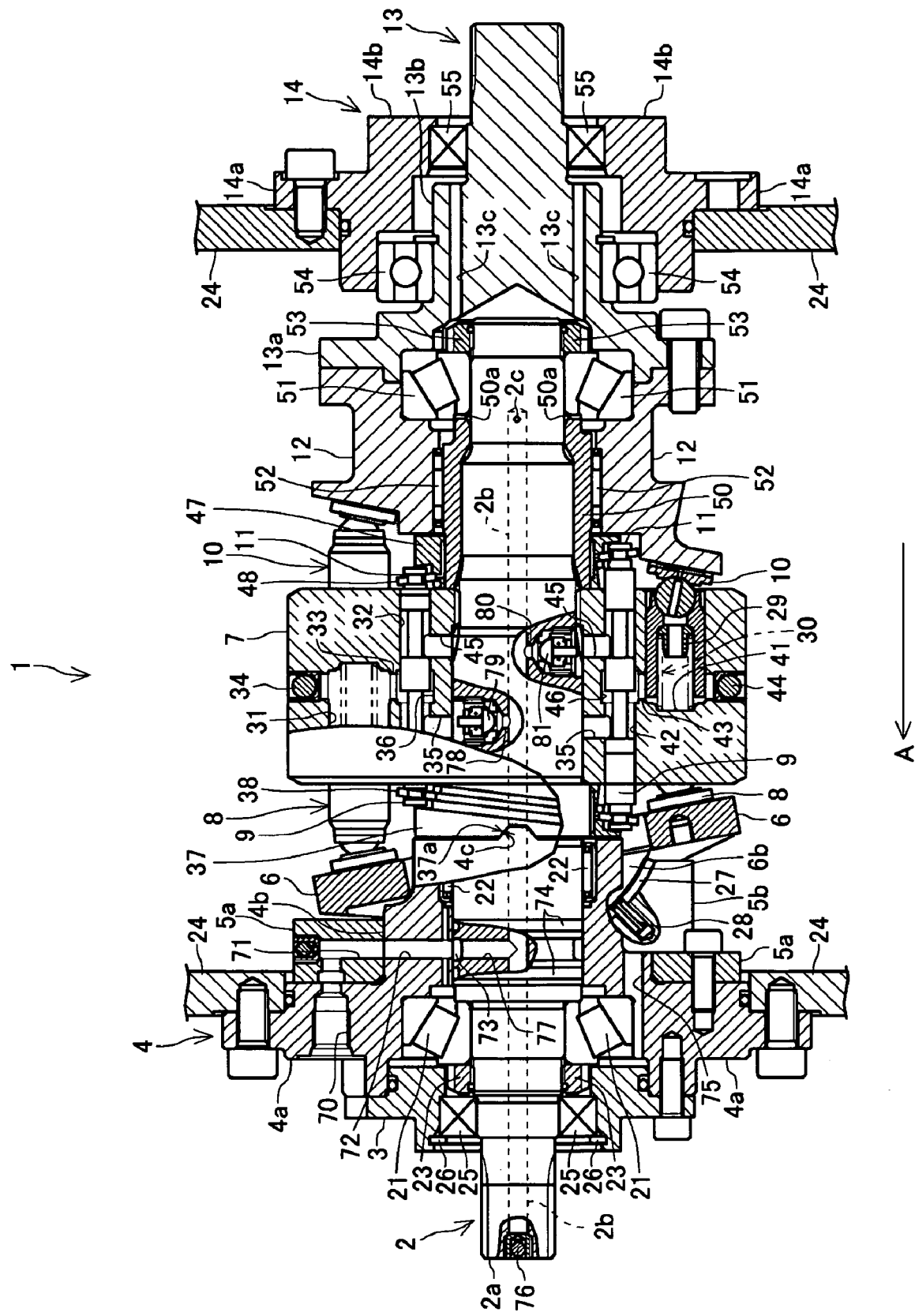
FIG. 1 is a sectional side view of the first embodiment of hydraulic equipment.

Hereinafter, explanation will be given on the detailed construction of a hydraulic stepless transmission 1 which is the first embodiment of the present invention according to FIGS. 1 to 8. In addition, the hydraulic stepless transmission 1 of this embodiment is widely used for varying the traveling driving force of a working vehicle (a tractor or the like). However, the use of the transmission is not limited thereto and the transmission is also available widely in each of industrial fields, such as industrial equipment or a vehicle.

The hydraulic stepless transmission 1 mainly comprises an input shaft 2, an input side housing lid 3, an input side bearing housing 4, a swash plate holding member 5, an input side swash plate 6, a cylinder block 7, input side plungers 8, input side spool valves 9, output side plungers 10, output side spool valves 11, an output side swash plate 12, an output shaft 13, and an output side bearing housing 14.

In the below explanation, the direction of an arrow A in FIG. 1 (the direction along which a tip 2a is projected on the axis of the input shaft 2) is defined as "forward".

Hereinafter, explanation will be given in detail on the input shaft 2 which is a first rotary shaft of this embodiment according to FIG. 1.

The input shaft 2 transmits driving force from a driving source, such as an engine, to the hydraulic stepless transmission 1. The input shaft 2 is pivotally supported rotatably by the input side bearing housing 4 through an input side conical bearing 21 and an input side needle bearing 22. The inner ring of the input side conical bearing 21 is fixed by a stepped part provided on the input shaft 2 and an input side bearing clamping nut 23 screwed on the input shaft 2 from the side of the tip 2a so as not to be rotatable relatively to the input shaft 2. The cylinder block 7 is spline-fitted on the input shaft 2 so as not to be rotatable relatively.

Hereinafter, explanation will be given in detail on the input side bearing housing 4 which is a bearing member pivotally supporting the first rotary shaft of this embodiment according to FIG. 1.

A flange part 4a, which constitutes the front part of the input side bearing housing 4, is formed substantially discal, and bolt holes are formed at the periphery of the flange part 4a so as to fix the hydraulic stepless transmission 1 to a transmission casing or the like. In this embodiment, the flange part 4a is fixed to a transmission casing 24, in which the transmission of the working vehicle is housed, by screwing bolts. An O-ring is interposed between the input side bearing housing 4 and the transmission casing 24.

Accordingly, pressure oil is prevented from leaking out from the joint part between the input side bearing housing 4 and the transmission casing 24 to the outside of the transmission casing 24. Also, any foreign matter such as sand is prevented from entering inside the transmission casing 24 or the hydraulic stepless transmission 1.

On the other hand, a body part 4b, which constitutes the rear part of the input side bearing housing 4, is formed substantially cylindrically, and a through-hole is bored on the body part 4b so that the input shaft 2 passes therethrough. An outer ring of the input side conical bearing 21 is engaged with the inner peripheral surface of the front part of the through-hole, and the input side needle bearing 22 is engaged with the inner peripheral surface of the rear part thereof.

Hereinafter, explanation will be given in detail on the input side housing lid 3 according to FIG. 1.

The input side housing lid 3 is substantially discal, and a through-hole is bored at the center thereof so that the input shaft 2 passes therethrough. An oil seal 25 is interposed at the through-hole, between the input side housing lid 3 and the input shaft 2. A retaining ring 26 is provided at the front end of the through-hole of the input side housing lid 3 so as to prevent the oil seal 25 from falling off from the input side housing lid 3.

The input side housing lid 3 is fixed to the front end of the input side bearing housing 4 by screwing bolts. An O-ring is interposed between the input side housing lid 3 and the input side bearing housing 4.

Accordingly, pressure oil is prevented from leaking out from the joint parts between the input side housing lid 3 and the input shaft 2 and between the input side housing lid 3 and the input side bearing housing 4 to the outside of the transmission casing 24. Also, any foreign matter such as sand is prevented from entering inside the transmission casing 24 or the hydraulic stepless transmission 1.

Hereinafter, explanation will be given in detail on the swash plate holding member 5 according to FIG. 1.

The swash plate holding member 5 supports the input side swash plate 6 so that the slant angle of a swash plate surface 6a of the input side swash plate 6 (the angle between the axes of the swash plate surface 6a and the input shaft 2) can be changed. The swash plate holding member 5 comprises a substantially discal attachment part 5a that a hole is bored at the center thereof and holding parts 5b projected rearward from the attachment part 5a.

The attachment part 5a is engaged with the body part 4b of the input side bearing housing 4 and fixed to the flange part 4a of the input side bearing housing 4 by screwing bolts.

The holding parts 5b are projected rearward from the attachment part 5a. The rear ends of the holding parts 5b are hollow substantially semicircularly. A metal bearing 27 for swash plate is fixed to each of the semicircular hollows by a spring pin 28.

Hereinafter, explanation will be given in detail on the input side swash plate 6, which is the first swash plate of this embodiment, according to FIGS. 1 and 2.

The input side swash plate 6 converts the rotary driving force of the input shaft 2 into the power driving the input side plungers 8 reciprocally (that is, hydraulic pressure of pressure oil in a hydraulic circuit formed in the cylinder block 7). The input side swash plate 6 also changes the stroke of reciprocal movement of the input side plungers 8 (that is, amount of pressure oil pressed out by the reciprocal movement of the input side plungers 8) by changing the slant angle of the swash plate surface 6a. A hole is bored at the substantial center of the input side swash plate 6 so that the input shaft 2 passes therethrough. The swash plate surface 6a which is a plate surface is formed on one of sides of the input side swash plate 6.

A projected end (touching disc 8c) of the input side plunger 8 touches the swash plate surface 6a. On the other hand, holding parts 6b are projectingly provided on the other plate surface. The shape of the holding parts 6b correspond to the semicircular hollows of the holding parts 5b of the swash plate holding member 5. The input side swash plate 6 can be rotated while touching the holding parts 5b of the swash plate holding member 5 (more exactly, the metal bearings 27 for swash plate provided on the semicircular hollows when viewed in side) with the holding parts 6b. The slant angle of the swash plate surface 6a (the angle between the axes of the swash plate surface 6a and the input shaft 2) can be changed.

The size of the hole bored at the substantial center of the input side swash plate 6 is defined so that the input shaft 2 does not interfere with the input side swash plate 6 in the case of rotation of the input side swash plate 6.

Hereinafter, explanation will be given in detail on the cylinder block 7, which is an example of the cylinder block of this embodiment, according to FIGS. 1, 2 and 3.

The cylinder block 7 is substantially cylindrical. A through-hole 7c is bored at the substantial center of the cylinder block 7 so that the input shaft 2 penetrates the cylinder block 7 from an input side end surface 7a to an output side end surface 7b. The rear end (the end at the side of the output side end surface 7b) of the through-hole 7c is spline-processed.

On the other hand, the part of the outer peripheral surface of the input shaft 2, corresponding to the spline-processed part of the cylinder block 7 in the case of inserting the input shaft 2 into the cylinder block 7, is also spline-processed. Accordingly, the cylinder block 7 is spline-engaged and rotated integrally with the input shaft 2 so as not to be rotatable relatively.

The input side end surface 7a faces to the input side swash plate 6. The output side end surface 7b faces to the output side swash plate 12. Both the input side end surface 7a and the output side end surface 7b are perpendicular to the axis of the input shaft 2.

Seven input side plunger holes 31 and seven input side spool valve holes 32 are bored on the cylinder block 7 from the input side end surface 7a along the axis of the input shaft 2.

The input side plunger holes 31 are bored on the cylinder block 7 so as to house the input side plungers 8. The longer direction of each of the input side plunger holes 31 is in parallel to the axis of the input shaft 2. Each of the input side plunger holes 31 does not penetrate the output side end surface 7b and is bored so as to reach the position slightly closer to the output side end surface 7b than the position which is the center between the input side end surface 7a and the output side end surface 7b.

The input side spool valve holes 32 are bored on the cylinder block 7 so as to house the input side spool valves 9. The longer direction of each of the input side spool valve holes 32 is in parallel to the axis of the input shaft 2. The input side spool valve holes 32 penetrate the output side end surface 7b.

Figure 3:
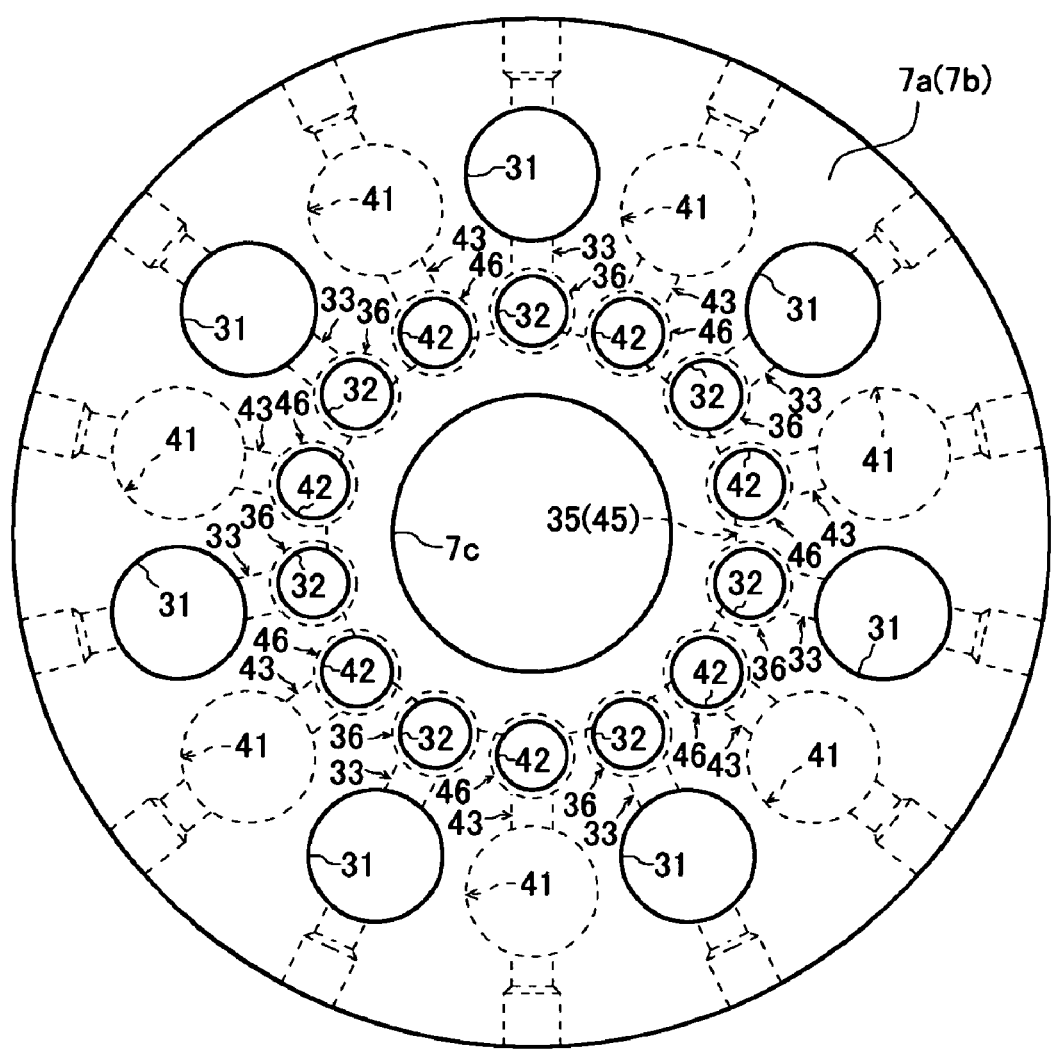
FIG. 3 is a front view of the cylinder block.

As shown in FIG. 3, when viewed in the axial direction of the input shaft 2, the input side plunger holes 31 are arranged so that the distance from the through-hole 7c, into which the input shaft 2 is inserted, to each of the input side plunger holes 31 is same (that is, the input side plunger holes 31 are arranged on one circle centering on the through-hole 7c) and the distance between each of the input side plunger holes 31 is same.

Also, when viewed in the axial direction of the input shaft 2, the input side spool valve holes 32 are arranged so that the distance from the through-hole 7c, into which the input shaft 2 is inserted, to each of the input side spool valve holes 32 is same (that is, the input side spool valve holes 32 are arranged on one circle centering on the through-hole 7c) and the distance between each of the input side spool valve holes 32 is same. In this case, the through-hole 7c is closer to each of the input side spool valve holes 32 than each of the input side plunger holes 31. The center of each of the input side spool valve holes 32 is arranged on the straight line connecting the center of the through-hole 7c and the center of one of the input side plunger holes 31 in the radial direction of the cylinder block 7.

Seven communication holes 33 are bored from the outer peripheral surface of the cylinder block 7. Each of the communication holes 33 communicates one pair of the input side plunger hole 31 and the input side spool valve hole 32 with each other.

In this case, each of the communication holes 33 is bored at the substantial center of the cylinder block 7 in the axial direction of the input shaft 2. The end of each of the communication holes 33 on the outer peripheral surface of the cylinder block 7 is closed by a seal plug 34.

Each of plural confluence parts 36 communicates one pair of the communication hole 33 and the input side plunger hole 31 with each other. The inner diameter of each of the confluence parts 36 is larger than that of the input side spool valve holes 32.

Accordingly, when one of the input side plunger holes 31 is intercepted from an input side oil chamber 35 and an output side oil chamber 45 by a radial extended part 9a of the input side spool valve 9 (that is, the valve is at the neutral position), oil pressure effects to the outer perimeter of the radial extended parts 9a equally. Therefore, the input side spool valve 9 is prevented from being pressed along a certain circumferential direction inside the input side spool valve hole 32.

The dimensional accuracy of the confluence parts 36 in the axial direction influence the accuracy of switching timing of the passage in the hydraulic circuit by the reciprocal movement of the input side spool valves 9. With regard to this embodiment, the confluence parts 36 are bored at the time of boring the input side spool valve holes 32 simultaneously so as to form the confluence parts 36 accurately dimensionally.

Seven output side plunger holes 41 and seven output side spool valve holes 42 are bored on the cylinder block 7 from the output side end surface 7b along the axis of the input shaft 2.

The output side plunger holes 41 are bored on the cylinder block 7 so as to house the output side plungers 10. The longer direction of each of the output side plunger holes 41 is in parallel to the axis of the input shaft 2. Each of the output side plunger holes 41 does not penetrate the output side end surface 7b and is bored so as to reach the position slightly closer to the input side end surface 7a than the position which is the center between the input side end surface 7a and the output side end surface 7b.

The output side spool valve holes 42 are bored on the cylinder block 7 so as to house the output side spool valves 11. The longer direction of each of the output side spool valve holes 42 is in parallel to the axis of the input shaft 2. The output side spool valve holes 42 penetrate the input side end surface 7a.

As shown in FIG. 3, when viewed in the axial direction of the input shaft 2, the output side plunger holes 41 are arranged so that the distance from the through-hole 7c, into which the input shaft 2 is inserted, to each of the output side plunger holes 41 is same (that is, the output side plunger holes 41 are arranged on one circle centering on the through-hole 7c) and the distance between each of the output side plunger holes 41 is same.

Also, when viewed in the axial direction of the input shaft 2, the output side spool valve holes 42 are arranged so that the distance from the through-hole 7c, into which the input shaft 2 is inserted, to each of the output side spool valve holes 42 is same (that is, the output side spool valve holes 42 are arranged on one circle centering on the through-hole 7c) and the distance between each of the output side spool valve holes 42 is same. In this case, the through-hole 7c is closer to each of the output side spool valve holes 42 than each of the output side plunger holes 41. The center of each of the output side spool valve holes 42 is arranged on the straight line connecting the center of the through-hole 7c and the center of one of output side plunger holes 41 in the radial direction of the cylinder block 7.

Seven communication holes 43 are bored from the outer peripheral surface of the cylinder block 7. Each of the communication holes 43 communicates one pair of the output side plunger hole 41 and the output side spool valve hole 42 with each other.

In this case, each of the communication holes 43 is bored at the substantial center of the cylinder block 7 in the axial direction of the input shaft 2. The end of each of the communication holes 43 on the outer peripheral surface of the cylinder block 7 is closed by a seal plug 44.

Each of plural confluence parts 46 communicates one pair of the communication hole 43 and the input side plunger hole 41 with each other. The inner diameter of each of the confluence parts 46 is larger than that of the output side spool valve holes 42.

Accordingly, when one of the output side plunger holes 41 is intercepted from the input side oil chamber 35 and the output side oil chamber 45 by a radial extended part 11a of the output side spool valve 11 (that is, the valve is at the neutral position), oil pressure effects to the outer perimeter of the radial extended part 11a equally. Therefore, the output side spool valve 11 is prevented from being pressed along a certain circumferential direction inside the output side spool valve hole 42.

The dimensional accuracy of the confluence parts 46 in the axial direction influence the accuracy of switching timing of the passage in the hydraulic circuit by the reciprocal movement of the output side spool valves 11. With regard to this embodiment, the confluence parts 46 are bored at the time of boring the output side spool valve holes 42 simultaneously so as to form the confluence parts 46 accurately dimensionally.

As shown in FIG. 3, the input side plunger holes 31 and the output side plunger holes 41 are arranged alternately when viewed in the axial direction of the input shaft 2 (that is, on the circle centering on the through-hole 7c, the plunger holes are arranged in the order that the input side plunger hole 31, the output side plunger hole 41, the input side plunger hole 31, the output side plunger hole 41, and so forth).

Also, the input side spool valve holes 32 and the output side spool valve holes 42 are arranged alternately when viewed in the axial direction of the input shaft 2 (that is, on the circle centering on the through-hole 7c, the plunger holes are arranged in the order that the input side spool valve hole 32, the output side spool valve hole 42, the input side spool valve hole 32, the output side spool valve hole 42, and so forth).

Figure 2:
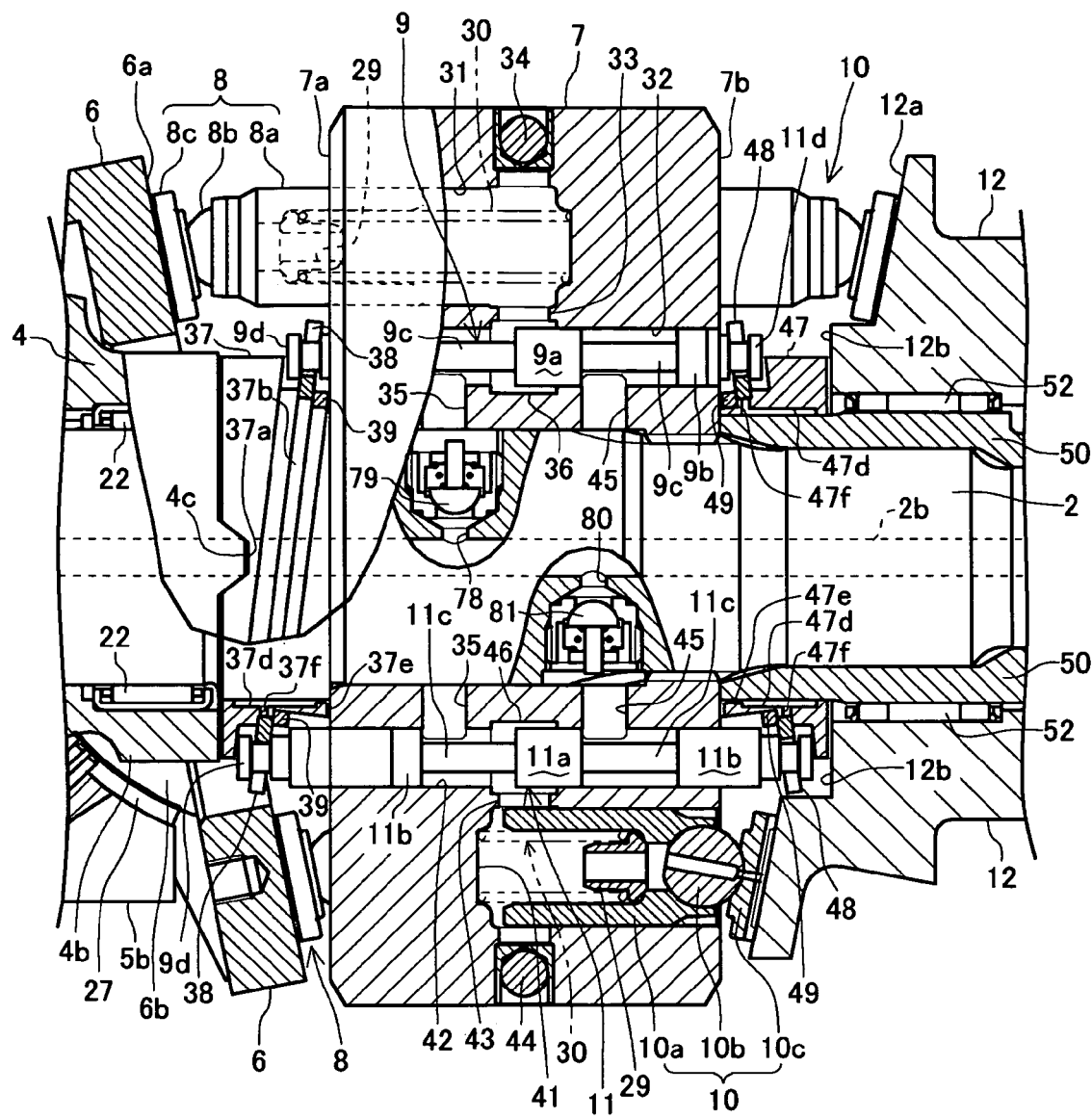
FIG. 2 is a sectional side view of a cylinder block of the first embodiment of the hydraulic equipment.

As shown in FIG. 2, first and second two inner peripheral grooves are formed on the inner peripheral surface of the through-hole 7c of the cylinder block 7. The inner peripheral grooves are ring-like shaped along the circumferential direction of the inner peripheral surface. Each of the inner peripheral grooves is communicated with the input side spool valve hole 32 and the output side spool valve hole 42.

Hereinafter, the space enclosed by the first inner peripheral groove near the input side end surface 7a and the outer peripheral surface of the input shaft 2 is referred to as the input side oil chamber 35, and the space enclosed by the second inner peripheral groove near the output side end surface 7b and the outer peripheral surface of the input shaft 2 is referred to as the output side oil chamber 45.

In addition, in this embodiment, the number of each of the input side plungers 8, the input side spool valves 9, the output side plungers 10 and the output side spool valves 11, which are housed in the cylinder block 7, is seven respectively. However, the number is not limited thereto, and the number should just be two or more so as to obtain the same effect.

Hereinafter, explanation will be given in detail on the input side plungers 8, which are examples of the first plungers of the hydraulic equipment of the present invention, and the output side plungers 10, which are examples of the second plungers of the hydraulic equipment of the present invention, according to FIGS. 1 and 2.

In addition, in this embodiment, the shape of each of the input side plungers 8 is the same as that of the output side plungers 10 for the common use of these members. However, the construction is not limited thereto and the shape of each of the input side plungers 8 may not be the same as that of the output side plungers 10.

The input side plungers 8 convert the rotational driving force of the input shaft 2 into the pressure of pressure oil in the hydraulic circuit formed in the cylinder block 7. The output side plungers 10 convert the pressure of pressure oil in the hydraulic circuit formed in the cylinder block 7 into the rotational driving force of the output shaft 13.

The input side plungers 8 are housed in the input side plunger holes 31 respectively. The output side plungers 10 are housed in the output side plunger holes 41 respectively.

As shown in FIG. 2, each of the input side plungers 8 mainly comprises a plunger part 8a, a ball 8b and the touching disc 8c.

The plunger part 8a is substantially cylindrical, and is slidable reciprocally while touching the input side plunger hole 31 of the cylinder block 7. The ball 8b is substantially spheric and is fixed to the touching disc 8c, which is substantially discal. The touching disc 8c is slidably connected to the projecting end of plunger part 8a (one of ends which is projected from the input side end surface 7a toward the input side swash plate 6) through the ball 8b. The projecting end of plunger part 8a is blocked by the ball 8b (more exactly, lubricating oil passages are bored on the ball 8b and the touching disc 8c, and pressure oil in the input side plunger hole 31 is leaked out little by little from the lubricating oil passages to the touching surface between the touching disc 8c and the input side swash plate 6 so as to lubricate the touching surface).

A spring retainer 29 and a spring 30 are housed in the plunger part 8a. One of ends of the spring 30 touches the spring retainer 29, and the other end thereof is projected out from the opening end of the plunger part 8a and touches the wall surface of the input side plunger hole 31. Therefore, the input side plunger 8 is biased by the spring 30 so as to project out from the input side end surface 7a of the cylinder block 7 (that is, so that the touching disc 8c touches the swash plate surface 6a of the input side swash plate 6).

As shown in FIG. 2, each of the output side plungers 10 mainly comprises a plunger part 10a, a ball 10b and the touching disc 10c.

The plunger part 10a is substantially cylindrical, and is slidable reciprocally while touching the input side plunger hole 41 of the cylinder block 7. The ball 10b is substantially spheric and is fixed to the touching disc 10c, which is substantially discal. The touching disc 10c is slidably connected to the projecting end of plunger part 10a (one of ends which is projected from the input side end surface 7b toward the output side swash plate 12) through the ball 10b. The projecting end of plunger part 10a is blocked by the ball 10b

(more exactly, lubricating oil passages are bored on the ball 10*b* and the touching disc 10*c*, and pressure oil in the output side plunger hole 41 is leaked out little by little from the lubricating oil passages to the touching surface between the touching disc 10*c* and the output side swash plate 12 so as to lubricate the touching surface).

A spring retainer 29 and a spring 30 are housed in the plunger part 10*a*. One of ends of the spring 30 touches the spring retainer 29, and the other end thereof is projected out from the opening end of the plunger part 10*a* and touches the wall surface of the output side plunger hole 41. Therefore, the output side plunger 10 is biased by the spring 30 so as to project out from the input side end surface 7*b* of the cylinder block 7 (that is, so that the touching disc 10*c* touches the swash plate surface 12*a* of the output side swash plate 12).

Figure 4:
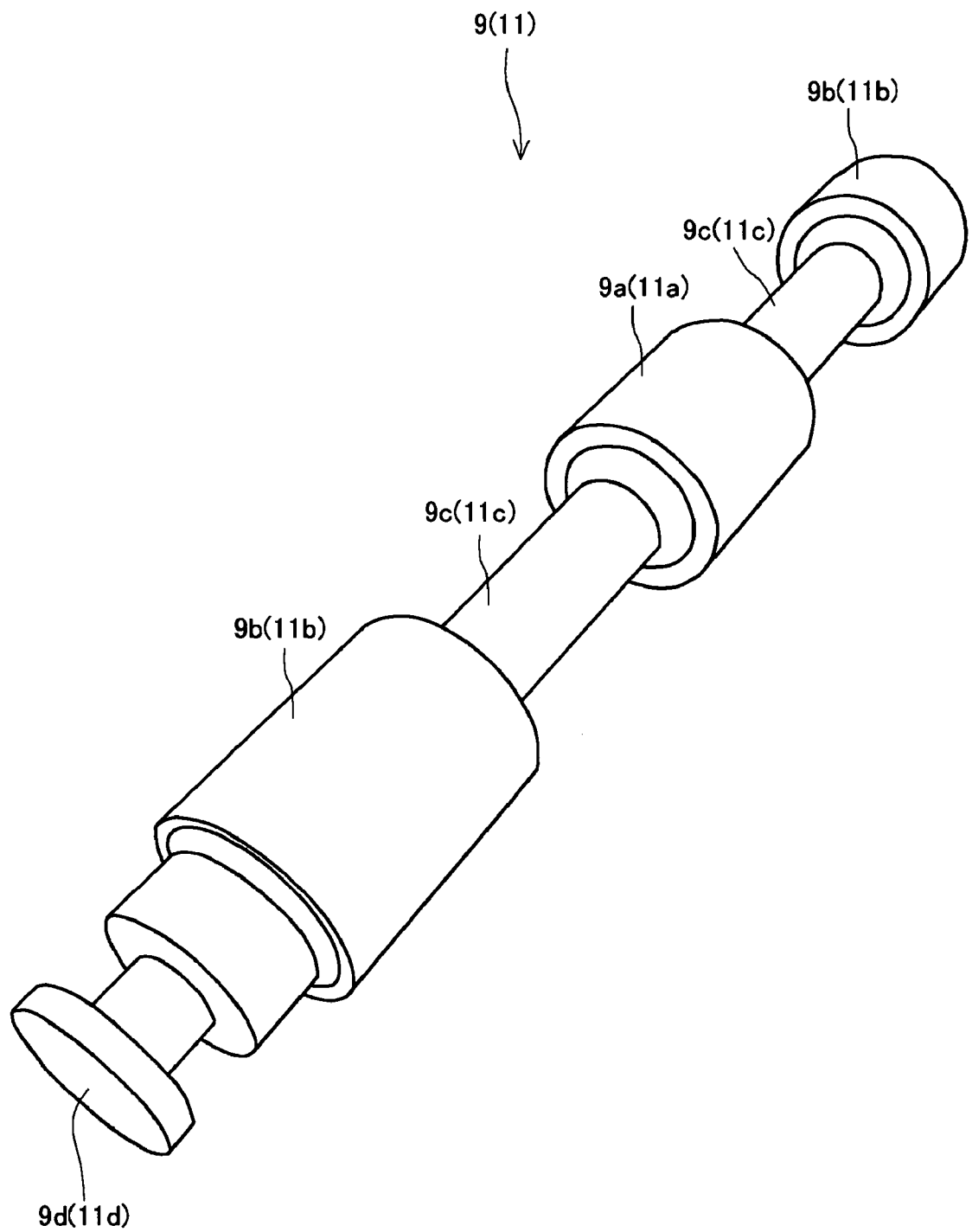
FIG. 4 is a perspective view of a spool valve.
Figure 5:
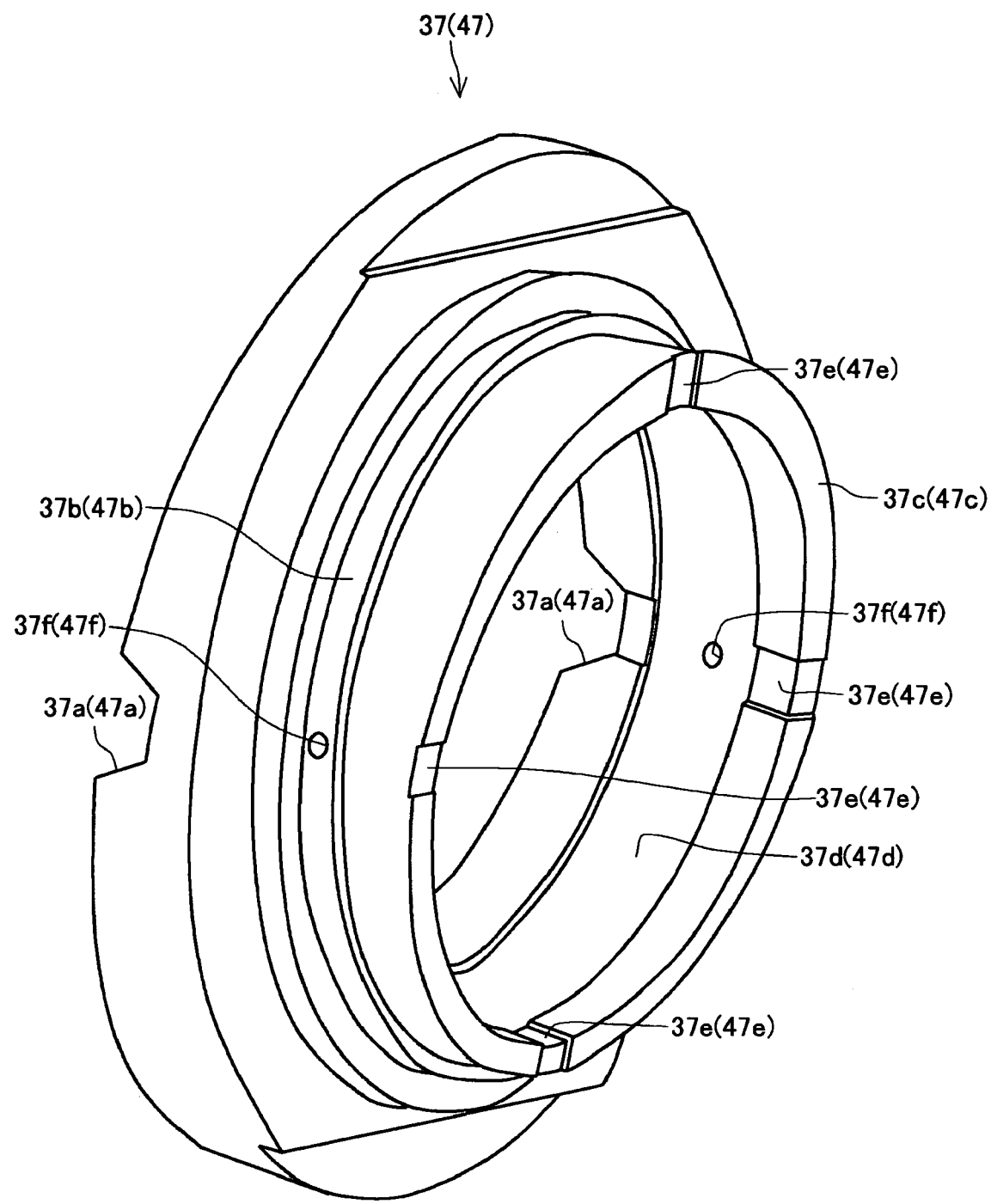
FIG. 5 is a perspective view of a spool valve guide of the first embodiment of the hydraulic equipment.
Figure 6:
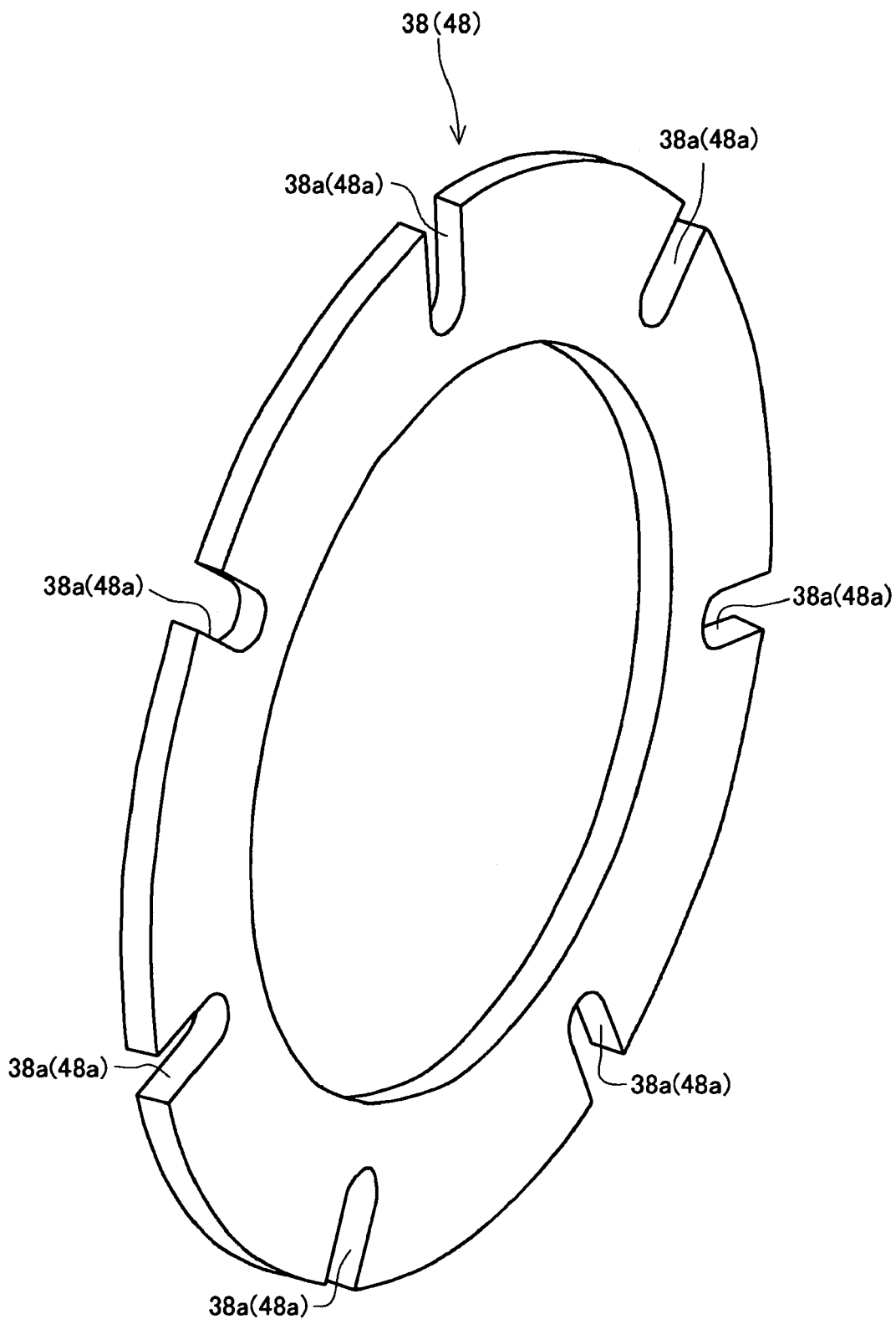
FIG. 6 is a perspective view of a holding member of the first embodiment of the hydraulic equipment.
Figure 7:
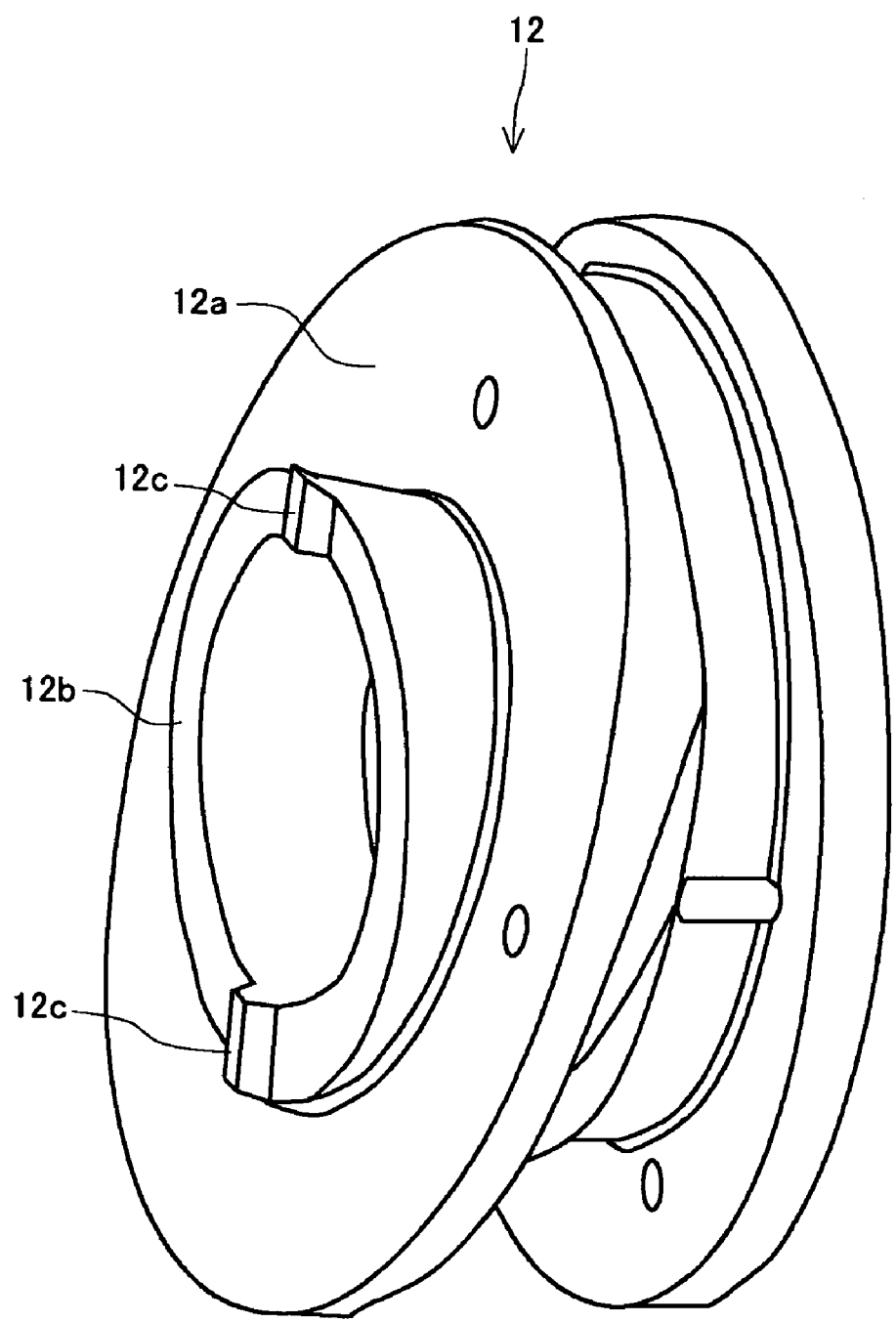
FIG. 7 is a perspective view of an output side swash plate.
Figure 8:
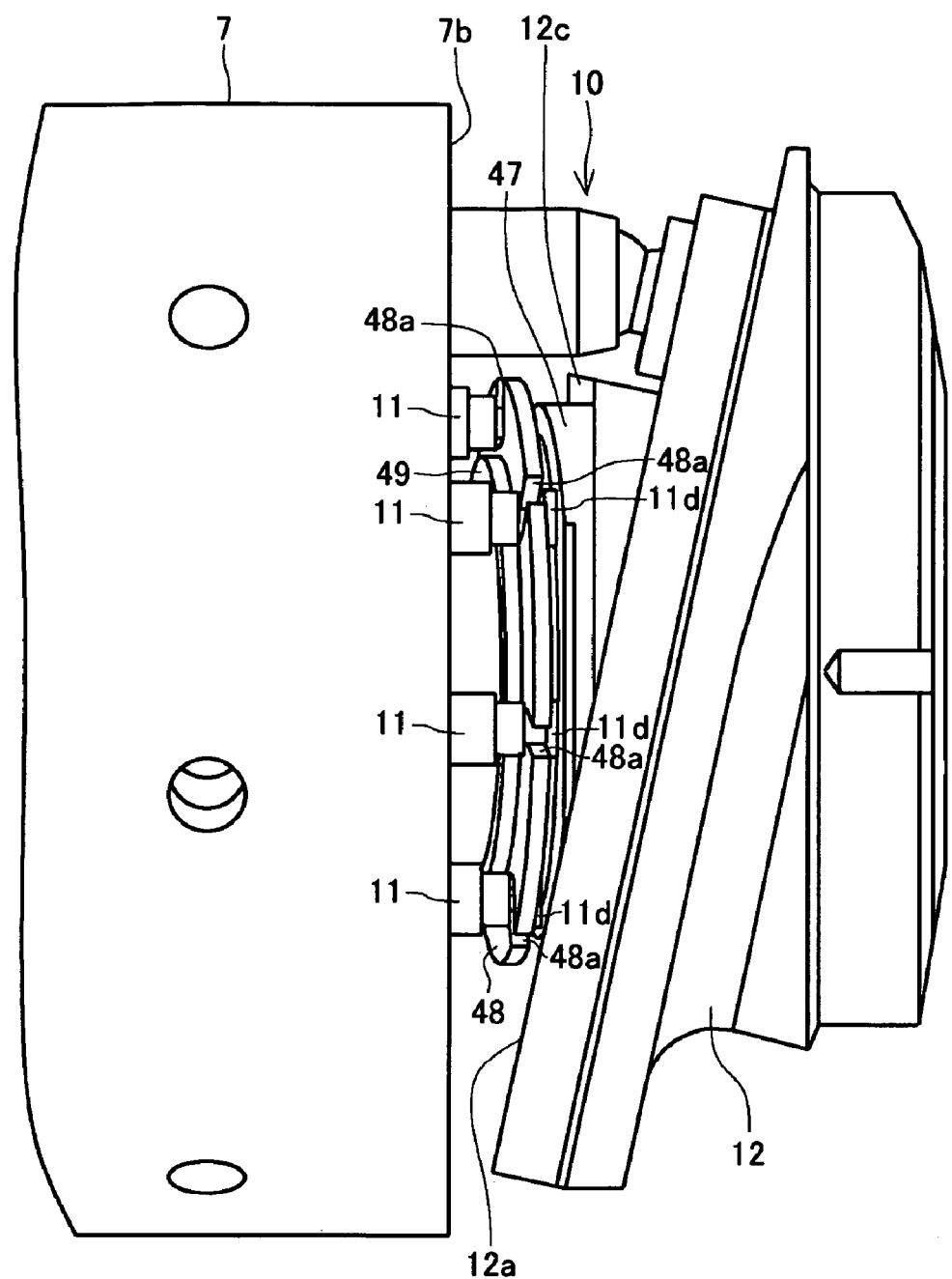
FIG. 8 is a side view of the principal part of the first embodiment of the hydraulic equipment.

Hereinafter, explanation will be given in detail on the input side spool valves 9, which are examples of the first spool valves of the hydraulic equipment of the present invention, and the output side spool valves 11, which are examples of the second spool valves of the hydraulic equipment of the present invention, according to FIGS. 2 and 4.

In addition, in this embodiment, the shape of each of the input side spool valves 9 is the same as that of the output side spool valves 11 for the common use of these members. However, the construction is not limited thereto and the shape of each of the input side spool valves 9 may not be the same as that of the output side spool valves 11.

Each of the input side spool valves 9 switches the passage for hydraulic oil communicated with the input side plunger hole 31 in which the input side plunger 8 is housed. Each of the input side spool valves 9 has substantially cylindrical members difference in their diameters respectively, and mainly comprises the radial extended part 9*a*, radial extended parts 9*b*, valve stems 9*c*, and an engaging part 9*d*.

The radial extended parts 9*a* and 9*b* are substantially cylindrical and the outer diameter of each of them is substantially the same as the inner diameter of the input side spool valve hole 32 formed in the cylinder block 7. Therefore, the radial extended parts 9*a* and 9*b* are reciprocally slidable airtightly in the input side spool valve hole 32.

The radial extended part 9*a* is arranged at the middle portion (or the substantial center) of the input side spool valve 9 in the longer direction (the direction of reciprocal movement). The radial extended parts 9*b* are arranged respectively at the both ends of the input side spool valve 9 in the longer direction.

The valve stems 9*c* are substantially cylindrical and the outer diameter thereof is smaller than that of the radial extended parts 9*a* and 9*b*. The valve stems 9*c* are positioned between the radial extended part 9*a* and the radial extended parts 9*b*.

The engaging part 9*d* is projected from one of the radial extended parts 9*b* along the longer direction of the input side spool valve 9. The connection part between the engaging part 9*d* and the radial extended part 9*b* is constricted and is engaged with an input side spool valve guide 37.

The input side spool valve 9 is slidably inserted into the input side spool valve hole 32 so that the engaging part 9*d* is projected out from the input side end surface 7*a* of the cylinder block 7.

The extended part 9*b* connected to the engaging part 9*d* is always positions at the side of the input side end surface 7*a* from the communication part at which the input side oil chamber 35, formed by the first inner peripheral groove, and the input side spool valve hole 32 are communicated with each other even if the input side spool valve 9 is moved reciprocally in the input side spool valve hole 32. The other extended part 9*b* separated from the engaging part 9*d* is always positions at the side of the input side end surface 7*b* from the communication part at which the output side oil chamber 45, formed by the second inner peripheral groove, and the input side spool valve hole 32 are communicated with each other even if the input side spool valve 9 is moved reciprocally in the input side spool valve hole 32.

Furthermore, the radial extended part 9*a* is arranged in the confluence part 36 between the communication oil passage communicating the input side plunger hole 31 with the input side spool valve hole 32 (the communication hole 33) and the input side spool valve hole 32. In this case, the inner diameter of the confluence part 36 is larger than the outer diameter of the radial extended part 9*a*. Moreover, the length of the confluence part 36 is substantially the same as that of the radial extended part 9*a* in the longer direction (the direction of reciprocal movement).

Therefore, by sliding the input side spool valve 9 in the input side spool valve hole 32, the radial extended part 9*a* can be moved among three positions, (1) the position that the input side oil chamber 35 is intercepted from the input side plunger hole 31 and the output side oil chamber 45 is communicated with the input side plunger hole 31, (2) the position that the input side oil chamber 35, the output side oil chamber 45 and the input side plunger hole 31 are intercepted from each other, and (3) the position that the input side oil chamber 35 is communicated with the input side plunger hole 31 and the output side oil chamber 45 is intercepted from the input side plunger hole 31.

In addition, the relation between the length of the confluence part 36 and that of the radial extended part 9*a* in the longer direction of the input side spool valve 9 is selected corresponding to the driving characteristics of the hydraulic equipment of the present invention. Accordingly, the relation is not limited to this embodiment that the length of the confluence part 36 is substantially the same as that of the radial extended part 9*a* in the longer direction of the input side spool valve 9. Namely, in the longer direction of the input side spool valve 9, the confluence part 36 may be longer or shorter than the radial extended part 9*a*.

Each of the output side spool valves 11 switches the passage for hydraulic oil communicated with the output side plunger hole 41 in which the output side plunger 10 is housed. Each of the output side spool valves 11 has substantially cylindrical members difference in their diameters respectively, and mainly comprises the radial extended part 11*a*, radial extended parts 11*b*, valve stems 11*c*, and an engaging part 11*d*.

The radial extended parts 11*a* and 11*b* are substantially cylindrical and the outer diameter of each of them is substantially the same as the inner diameter of the output side spool valve hole 42 formed in the cylinder block 7. Therefore, the radial extended parts 11*a* and 11*b* are reciprocally slidable airtightly in the output side spool valve hole 42.

The radial extended part 11*a* is arranged at the middle portion (or the substantial center) of the output side spool valve 11 in the longer direction (the direction of reciprocal movement). The radial extended parts 11*b* are arranged respectively at the both ends of the output side spool valve 11 in the longer direction.

The valve stems 11*c* are substantially cylindrical and the outer diameter thereof is smaller than that of the radial extended parts 11*a* and 11*b*. The valve stems 11*c* are positioned between the radial extended part 11*a* and the radial extended parts 11*b*.

The engaging part 11d is projected from one of the radial extended parts 11b along the longer direction of the output side spool valve 11. The connection part between the engaging part 11d and the radial extended part 11b is constricted and is engaged with an output side spool valve guide 47.

The output side spool valve 11 is slidably inserted into the output side spool valve hole 42 so that the engaging part 11d is projected out from the output side end surface 7b of the cylinder block 7.

The extended part 11b connected to the engaging part 11d is always positions at the side of the output side end surface 7b from the communication part at which the output side oil chamber 45, formed by the first inner peripheral groove, and the output side spool valve hole 42 are communicated with each other even if the output side spool valve 11 is moved reciprocally in the output side spool valve hole 42. The other extended part 11b separated from the engaging part 11d is always positions at the side of the output side end surface 7b from the communication part at which the output side oil chamber 45, formed by the second inner peripheral groove, and the output side spool valve hole 42 are communicated with each other even if the output side spool valve 11 is moved reciprocally in the output side spool valve hole 42.

Furthermore, the radial extended part 11a is arranged in the confluence part 46 between the communication oil passage communicating the output side plunger hole 41 with the output side spool valve hole 42 (the communication hole 43) and the output side spool valve hole 42. In this case, the inner diameter of the confluence part 46 is larger than the outer diameter of the radial extended part 11a. Moreover, the length of the confluence part 46 is substantially the same as that of the radial extended part 11a in the longer direction (the direction of reciprocal movement).

Therefore, by sliding the output side spool valve 11 in the output side spool valve hole 42, the radial extended part 11a can be moved among three positions, (1) the position that the input side oil chamber 35 is intercepted from the output side plunger hole 41 and the output side oil chamber 45 is communicated with the output side plunger hole 41, (2) the position that the input side oil chamber 35, the output side oil chamber 45 and the output side plunger hole 41 are intercepted from each other, and (3) the position that the input side oil chamber 35 is communicated with the output side plunger hole 41 and the output side oil chamber 45 is intercepted from the output side plunger hole 41.

In addition, the relation between the length of the confluence part 46 and that of the radial extended part 11a in the longer direction of the output side spool valve 11 is selected corresponding to the driving characteristics of the hydraulic equipment of the present invention. Accordingly, the relation is not limited to this embodiment that the length of the confluence part 46 is substantially the same as that of the radial extended part 11 a in the longer direction of the output side spool valve 11. Namely, in the longer direction of the output side spool valve 11, the confluence part 46 may be longer or shorter than the radial extended part 11a.

Hereinafter, explanation will be given in detail on a spacer 50 according to FIGS. 1 and 2. The spacer 50 is substantially cylindrical and is engaged with the input shaft 2 from the outside closer to the output side swash plate 12 than the cylinder block 7. The front end surface of the spacer 50 touches the output side end surface 7b of the cylinder block 7. The rear end surface of the spacer 50 touches an inner ring of an output side conical bearing 51 engaged with the input shaft 2 from the outside. At this time, the inner ring of the output side conical bearing 51 and the spacer 50 push the output side end surface 7b of the cylinder block 7 forward by an output side bearing clamping nut 53 screwed to the rear end of the input shaft 2. Accordingly, the input side end surface 7a of the cylinder block 7 is pressed to the stepped part provided on the input shaft 2 so that the cylinder block 7 is fixed to the input shaft 2.

Hereinafter, explanation will be given in detail on the output side bearing housing 14, which is a bearing member pivotally supporting the second rotary shaft of this embodiment, according to FIG. 1.

The output side bearing housing 14 is constructed by forming a flange part 14a at a periphery of a body part 14b, which is substantially cylindrical. A through-hole is provided at the center of the body part 14b so that the output shaft 13 penetrates the hole. Bolt holes are bored on the flange part 14a so as to fix the hydraulic stepless transmission 1 to a transmission casing or the like. In this embodiment, the flange part 14a is fixed to the transmission casing 24, in which the transmission of the working vehicle is housed, by screwing bolts.

A ball bearing 54 is engaged at the front end of the through-hole of the output side bearing housing 14. The output shaft 13 is pivotally supported through the ball bearing 54. An oil seal 55 is interposed between the front end of the through-hole of the output side bearing housing 14 and the output shaft 13. An O-ring is interposed between the outer peripheral surface of the body part 14b and the output side bearing housing 14. Accordingly, pressure oil is prevented from leaking out from the gap between the through-hole of the output side bearing housing 14 and the output shaft 13 and the joint parts between the output side bearing housing 14 and the transmission casing 24 to the outside of the transmission casing 24. Also, any foreign matter such as sand is prevented from entering inside the transmission casing 24 or the hydraulic stepless transmission 1.

Hereinafter, explanation will be given in detail on the output shaft 13, which is the second rotary shaft of this embodiment, according to FIG. 1.

The output shaft 13 outputs the driving force, which is transmitted to the hydraulic stepless transmission 1 through the input shaft 2 and then varied in speed by the hydraulic stepless transmission 1, to the outside. The output shaft 13 comprises a body part 13b and a flange part 13a. The output shaft 13 is arranged behind the input shaft 2, and the input shaft 2 and the output shaft 13 are coaxial mutually.

The body part 13b is substantially cylindrical and the ball bearing 54 is engaged therewith from the outside so that the body part 13b is pivotally supported rotatably by the output side bearing housing 14. The rear end of the body part 13b is projected rearward from the output side bearing housing 14. The flange part 13a is a substantially cylindrical member provided at the front end of the body part 13b, and bolt holes are bored on the flange part 13a so as to connect the flange part 13a to the output side swash plate 12.

Hereinafter, explanation will be given in detail on the output side swash plate 12, which is the second swash plate of this embodiment, according to FIGS. 1, 2, 7 and 8.

The output side swash plate 12 converts the power driving the output side plungers 10 reciprocally (that is, hydraulic pressure of pressure oil in the hydraulic circuit formed in the cylinder block 7) into the rotary driving force of the output shaft 13. A through-hole is bored at the substantial center of the output side swash plate 12, which is substantially cylindrical, so that the input shaft 2 (more exactly, the spacer 50 engaged with the input shaft 2 from the outside) passes the through-hole. The swash plate surface 12a is formed on the front part of the output side swash plate 12. The swash plate surface 12a make a fixed slant angle (the angle between the axes of the swash plate surface 12a and the input shaft 2) with the input shaft 2.

The rear end of the output side swash plate 12 is fixed to the flange part 13a of the output shaft 13 by screwing bolts so that the output side swash plate 12 is rotated integrally with the output shaft 13. In addition, the rear end of the through-hole of the output side swash plate 12 is engaged with the outer ring of the output side conical bearing 51, and an output side needle bearing 52 is interposed between the through-hole of the output side swash plate 12 and the spacer 50, whereby the output side swash plate 12 is rotatable relatively to the input shaft 2.

Hereinafter, explanation will be given in detail on the input side spool valve guide 37 and the output side spool valve guide 47, which are spool valve guides of the first embodiment of the hydraulic equipment of the present invention, according to FIGS. 1, 2, 5, 6, 7 and 8.

In addition, in this embodiment, the shape of the input side spool valve guide 37 is the same as that of the output side spool valve guide 47 for the common use of these members. However, the construction is not limited thereto and the shape of the input side spool valve guide 37 may not be the same as that of the output side spool valve guide 47.

The input side spool valve guide 37 is formed by processing mechanically on outer and inner peripheral surfaces of a substantial cylindrical member variously. The input side spool valve guide 37 moves the input side spool valves 9 reciprocally in cooperation with the rotation of the input shaft 2 (the cylinder block 7). The input side spool valve guide 37 is freely fitted on the input shaft 2 and interposed between the rear end of the body part 4b of the input side bearing housing 4, which is a bearing member pivotally supporting the input shaft 2 being the first rotary shaft, and the input side end surface 7a of the cylinder block 7. At the touching surface between the input side spool valve guide 37 and the input side bearing housing 4, recesses 37a are formed on the input side spool valve guide 37, and salients 4c are formed on the rear end surface of the body part 4b. By engaging the recesses 37a with the salients 4c, the input side spool valve guide 37 becomes not to be relatively rotatable against the input shaft 2. The salients 4c and the recesses 37a are substantially trapezoidal, and each of them has a surface which is slanted against the axis of the input shaft 2 (that is, which is not in parallel to a surface rectangular to the axis of the input shaft 2).

When the input side spool valve guide 37 pretends to be rotated following the rotation of the input shaft 2 and the cylinder block 7, the surfaces of the salients 4c and the recesses 37a, which are slanted against the axis of the input shaft 2, touch with each other so as to generate power pressing the input side spool valve guide 37 to touch the input side end surface 7a of the cylinder block 7.

Accordingly, at the time of actuating the hydraulic stepless transmission 1 (that is, at the time of rotating the input shaft 2), the input side spool valve guide 37 is prevented from being dragged with the cylinder block 7. Furthermore, since the input side spool valve guide 37 is always pressed to the input side end surface 7a of the cylinder block 7, the distance between a guide groove 37b formed on the input side spool valve guide 37 and the input side end surface 7a is maintained accurately.

In addition, substantially the same effect can be obtained by the construction that salients are formed on the input side spool valve guide 37 and recesses are formed on the input side bearing housing 4.

The ring-like guide groove 37b is formed on the outer peripheral surface of the input side spool valve guide 37. A virtual plane passing through the guide groove 37b is not rectangular to the axis of the input side spool valve guide 37 (which is substantially equal to the axis of the input shaft 2) and is slanted against the axis. Therefore, the distance between the guide groove 37b and a touching surface 37c, touching the cylinder block 7, according to the position of the guide groove 37b on the input side spool valve guide 37. In addition, the touching surface 37c is rectangular to the axis of the input shaft 2.

An input side holder 38 is substantially ring-like and freely engaged rotatably with the guide groove 37b of the input side spool valve guide 37. Holding grooves 38a of the number equal to that of the input side spool valves 9 are formed on the outer perimeter of the input side holder 38. The holding grooves 38a are engaged with the engaging parts 9d of the input side spool valves 9.

An input side holder presser 39 is ring-like and presses the input side holder 38 so as to prevent the input side holder 38 from falling off from the guide groove 37b of the input side spool valve guide 37.

A pressure oil groove 37d is formed circumferentially on the inner peripheral surface of the input side spool valve guide 37. Supply grooves 37e are provided so as to supply pressure oil collected in the pressure oil groove 37d to the touching part between the touching surface 37c and the input side end surface 7a of the cylinder block 7 for rubricating the touching part.

Pressure oil holes 37f communicating the pressure oil groove 37d with the guide groove 37b are bored. By the pressure oil holes 37f, pressure oil collected in the pressure oil groove 37d rubricates the touching parts between the input side spool valves 9 and each of the guide groove 37b, the input side holder 38 and the input side holder presser 39, whereby the friction is prevented so as to maintain the accuracy of each member.

When the input shaft 2 makes one rotation against the input side bearing housing 4 fixed to the transmission casing 24, the cylinder block 7 also makes one rotation against the input side bearing housing 4. Accordingly, the input side spool valves 9 engaged with the guide groove 37b by the input side holder 38 make a round of the outer peripheral surface of the input side spool valve guide 37 along the guide groove 37b. In this case, the virtual plane passing through the guide groove 37b is not in parallel to a surface rectangular to the axis of the input shaft 2 and is slanted against the input shaft 2, whereby the input side spool valves 9 go and return once along the axial direction of the input shaft 2.

With regard to the input side spool valve guide 37, for maintaining the accuracy of the reciprocal movement (the projection amount) of the input side spool valves 9, high dimensional accuracy (or flatness) is only required of the touching surface 37c touching the input side end surface 7a of the cylinder block 7 and the guide groove 37b to which the input side holder 38, engaged with the engaging parts 9d of the input side spool valves 9, is freely fitted. Accordingly, the manufacturing cost is reduced.

Furthermore, since the number of parts concerning to the accuracy of the reciprocal movement is reduced, the accumulation of manufacturing error is reduced (that is, the accuracy of the reciprocal movement is improved).

The output side spool valve guide 47 is formed by processing mechanically on outer and inner peripheral surfaces of a substantial cylindrical member variously. The output side spool valve guide 47 moves the output side spool valves 11 reciprocally in cooperation with the relative rotation of the input shaft 2 (the cylinder block 7) and the output shaft 13. The output side spool valve guide 47 is freely fitted on the front end of the outer peripheral surface of the spacer 50 rotated integrally with the input shaft 2 and interposed between a touching surface 12b of the output side swash plate 12, which is rotated integrally with the output shaft 13 being the second rotary shaft, and the output side end surface 7b of the cylinder block 7. At the touching surface between the output side spool valve guide 47 and the output side swash plate 12, recesses 47a are formed on the output side spool valve guide 47, and salients 12c are formed on the touching surface 12b formed at the front end of the output side swash plate 12. By engaging the recesses 47a with the salients 12c, the output side spool valve guide 47 becomes not to be relatively rotatable against the output side swash plate 12 and is rotated integrally with the output side swash plate 12. The salients 12c and the recesses 47a are substantially trapezoidal, and each of them has a surface which is slanted against the axis of the input shaft 2 (that is, which is not in parallel to a surface rectangular to the axis of the input shaft 2).

When the output side spool valve guide 47 pretends to be rotated relatively to the output side swash plate 12 following the rotation of the input shaft 2 and the cylinder block 7, the surfaces of the salients 12c and the recesses 47a, which are slanted against the axis of the input shaft 2, touch with each other so as to generate power pressing the output side spool valve guide 47 to touch the output side end surface 7b of the cylinder block 7.

Accordingly, at the time of actuating the hydraulic stepless transmission 1 (that is, at the time of rotating the input shaft 2 and the output shaft 13), the output side spool valve guide 47 is prevented from being dragged with the cylinder block 7. Furthermore, since the output side spool valve guide 47 is always pressed to the output side end surface 7b of the cylinder block 7, the distance between a guide groove 47b formed on the output side spool valve guide 47 and the output side end surface 7b is maintained accurately.

In addition, substantially the same effect can be obtained by the construction that salients are formed on the output side spool valve guide 47 and recesses are formed on the output side swash plate 12.

The ring-like guide groove 47b is formed on the outer peripheral surface of the output side spool valve guide 47. A virtual plane passing through the guide groove 47b is not rectangular to the axis of the output side spool valve guide 47 (which is substantially equal to the axis of the input shaft 2) and is slanted against the axis. Therefore, the distance between the guide groove 47b and a touching surface 47c, touching the cylinder block 7, according to the position of the guide groove 47b on the output side spool valve guide 47. In addition, the touching surface 47c is rectangular to the axis of the input shaft 2.

An output side holder 48 is substantially ring-like and freely engaged rotatably with the guide groove 47b of the output side spool valve guide 47. Holding grooves 48a of the number equal to that of the output side spool valves 11 are formed on the outer perimeter of the output side holder 48. The holding grooves 48a are engaged with the engaging parts 11d of the output side spool valves 11.

An output side holder presser 49 is ring-like and presses the output side holder 48 so as to prevent the output side holder 48 from falling off from the guide groove 47b of the output side spool valve guide 47.

A pressure oil groove 47d is formed circumferentially on the inner peripheral surface of the output side spool valve guide 47. Supply grooves 47e are provided so as to supply pressure oil collected in the pressure oil groove 47d to the touching part between the touching surface 47c and the output side end surface 7b of the cylinder block 7 for rubricating the touching part.

Pressure oil holes 47f communicating the pressure oil groove 47d with the guide groove 47b are bored. By the pressure oil holes 47f, pressure oil collected in the pressure oil groove 47d rubricates the touching parts between the output side spool valves 11 and each of the guide groove 47b, the output side holder 48 and the output side holder presser 49, whereby the friction is prevented so as to maintain the accuracy of each member.

When the output shaft 13 makes one rotation relatively against the input shaft 2, the output side spool valves 11 engaged with the guide groove 47b by the output side holder 48 make a round of the outer peripheral surface of the output side spool valve guide 47 along the guide groove 47b.

In this case, the virtual plane passing through the guide groove 47b is not in parallel to a surface rectangular to the axis of the input shaft 2 and is slanted against the input shaft 2, whereby the output side spool valves 11 go and return once along the axial direction of the input shaft 2.

With regard to the output side spool valve guide 47, for maintaining the accuracy of the reciprocal movement (the projection amount) of the output side spool valves 11, high dimensional accuracy (or flatness) is only required of the touching surface 47c touching the output side end surface 7b of the cylinder block 7 and the guide groove 47b to which the output side holder 48, engaged with the engaging parts 11d of the output side spool valves 11, is freely fitted. Accordingly, the manufacturing cost is reduced.

Furthermore, since the number of parts concerning to the accuracy of the reciprocal movement is reduced, the accumulation of manufacturing error is reduced (that is, the accuracy of the reciprocal movement is improved).

Hereinafter, explanation will be given in detail on a charge circuit according to FIGS. 1 and 2.

The charge circuit supplies pressure oil pressingly sent from a hydraulic pump (not shown) provided outside the hydraulic stepless transmission 1 to the closed hydraulic circuit in the cylinder block 7, and rubricates the touching parts between the members of the hydraulic stepless transmission 1.

An insertion hole 70 is bored on the front surface of the flange part 4a of the input side bearing housing 4. A hydraulic piping, which communicates the hydraulic pump (not shown) with the charge circuit, is connected to the insertion hole 70. The insertion hole 70 penetrates the rear surface of the flange part 4a of the input side bearing housing 4 and is communicated with one of ends of a communication hole 71 bored on the attachment part 5a of the swash plate holding member 5 touching the rear surface of the flange part 4a. The other end of the communication hole 71 is opened toward the inner peripheral surface of the attachment part 5a of the swash plate holding member 5 and is communicated with one of ends of a communication hole 72 bored on the body part 4b of the input side bearing housing 4 touching the inner peripheral surface of the attachment part 5a. The other end of the communication hole 72 is communicated with the inner peripheral surface of the through-hole of the body part 4b.

The communication hole 72 is branched forward and rearward at the middle portion thereof, and pressure oil is supplied through the forward-branched oil passage to the input side conical bearing 21 for the lubrication. The pressure oil after lubricating the input side conical bearing 21 is returned to the transmission casing 24 through a return oil passage 75 bored on the input side bearing housing 4. On the other hand, pressure oil is supplied through the rearward-branched oil passage of the communication hole 72 to the input side needle bearing 22 for the lubrication. Pressure oil is supplied through an oil passage (not shown) communicated with a supply hole 2b of the input shaft 2 to a space between the outer peripheral surface of the input shaft 2 and the inner peripheral surface of the input side spool valve guide 37 for the lubrication. The pressure oil after lubricating the input side needle bearing 22 and the input side spool valve guide 37 is returned to the transmission casing 24.

A ring-like entrance groove 73 is formed on the input shaft 2 at the position facing to one of the ends of the communication hole 72 which is communicated with the inner peripheral surface of the through-hole of the body part 4b.

The supply hole 2b is bored on the input shaft 2 along the axial direction thereof from the front end surface thereof. The rear end of the supply hole 2b corresponds to the front end of the inner ring of the output side conical bearing 51. An oil passage 2c is bored so as to communicate the rear end of the supply hole 2b with the outer peripheral surface of the input shaft 2.

The front end of the supply hole 2b is closed by a seal plug 76. A communication hole 77 is bored on the input shaft 2 so as to communicate the entrance groove 73 with the supply hole 2b.

An input side communication hole 78 is bored on the input shaft 2 so as to communicate the supply hole 2b with the input side oil chamber 35. An input side check valve 79 is provided at the middle portion of the input side communication hole 78. An output side communication hole 80 is bored on the input shaft 2 so as to communicate the supply hole 2b with the output side oil chamber 45. An output side check valve 81 is provided at the middle portion of the output side communication hole 80.

The input side check valve 79 prevents the back flow of pressure oil from the input side oil chamber 35 to the supply hole 2b. The output side check valve 81 prevents the back flow of pressure oil from the output side oil chamber 45 to the supply hole 2b.

The output side oil chamber 45 overlaps the spline part (the part spline-engaged with the cylinder block 7) formed on the input shaft 2. Some pressure oil in the output side oil chamber 45 leaks out to the spline part for the lubrication.

The oil passage 2c is communicated with an oil passage 50a formed on the rear end surface of the spacer 50. Accordingly, pressure oil is supplied through the oil passage 50a to the output side needle bearing 52 and the output side spool valve guide 47 for the lubrication. Pressure oil is supplied through an oil hole (not shown), which penetrates the spacer 50 and is communicated with the supply hole 2b of the input shaft 2, to a space between the outer peripheral surface of the spacer 50 and the inner peripheral surface of the output side spool valve guide 47 for the lubrication. The pressure oil after lubricating the output side needle bearing 52 and the output side spool valve guide 47 is returned to the transmission casing 24.

Pressure oil is supplied through the oil passage 50a to the output side conical bearing 51 for the lubrication. The pressure oil after lubricating the output side conical bearing 51 is supplied to the ball bearing 54 through return oil passages 13c bored on the output shaft 13 so as to lubricate the ball bearing 54, and then returned to the transmission casing 24.

As the above mentioned, pressure oil (scarce pressure oil) from the hydraulic pump (not shown) provided outside the hydraulic stepless transmission 1 passes through insertion hole 70, the communication hole 71, the communication hole 72, the entrance groove 73, the communication hole 77 and the supply hole 2b, and is supplied through the input side communication hole 78 or the output side communication hole 80 to the closed hydraulic circuit in the cylinder block 7.

In addition, the construction of the charge circuit is not limited to this embodiment. What is necessary is just to supply pressure oil to the closed hydraulic circuit in the cylinder block 7 while supplying the touching parts between the members of the hydraulic stepless transmission 1.

Hereinafter, explanation will be given in detail on the assembly method of the hydraulic stepless transmission 1 according to FIGS. 1 and 2.

Firstly, the cylinder block 7 is penetrated from the rear end thereof by the input shaft 2 until the cylinder block 7 touches the stepped part provided at the middle portion of the input shaft 2. At this time, the cylinder block 7 is spline-engaged with the input shaft 2.

Net, the spacer 50 is penetrated from the rear end thereof by the input shaft 2, and the output side spool valve guide 47 is freely fitted on the spacer 50.

Subsequently, the output side holder 48 and the output side holder presser 49 are attached to the output side spool valve guide 47. The output side spool valves 11 are housed in the output side spool valve holes 42 while the engaging parts 11d of the output side spool valves 11 is engaged with the holding grooves 48a of the output side holder 48. The output side plungers 10 are housed in the output side plunger holes 41 with the spring retainer 29 and the spring 30.

The output side needle bearing 52 and the outer ring of the output side conical bearing 51 are engaged with the output side swash plate 12, and then engaged with the outer perimeter of the spacer 50. The inner ring of the output side conical bearing 51 is engaged with the spacer 50 while touching the rear end surface of the spacer 50, and then screwed by the output side bearing clamping nut 53.

Subsequently, the input side holder 38 and the input side holder presser 39 are attached to the input side spool valve guide 37. The input side spool valves 9 are housed in the input side spool valve holes 32 while the engaging parts 9d of the input side spool valves 9 is engaged with the holding grooves 38a of the output side holder 38. The input side plungers 8 are housed in the input side plunger holes 31 with the spring retainer 29 and the spring 30.

Next, the swash plate holding member 5 and the input side needle bearing 22 are attached to the input side bearing housing 4, and the input side swash plate 6 touches the input side plungers 8. Then, the input side bearing housing 4 is engaged with the input shaft 2 from the front end of the input shaft 2. At this time, the holding parts 6b of the input side swash plate 6 are rotatably engaged with the holding parts 5b of the swash plate holding member 5.

In addition, it may alternatively be constructed that the holding parts 6b of the input side swash plate 6 are rotatably engaged with the holding parts 5b of the swash plate holding member 5 previously, and then the input side bearing housing 4, to which the swash plate holding member 5 and the input side needle bearing 22 are attached, is engaged with the input shaft 2 from the front end of the input shaft 2.

Subsequently, the outer ring of the input side conical bearing 21 is engaged with the input side bearing housing 4. The input shaft 2 is inserted into the inner ring of the input side conical bearing 21 until the inner ring touches the stepped part provided at the middle portion of the input shaft 2, and then screwed by the input side bearing clamping nut 23.

Furthermore, the input side housing lid 3 is engaged with the input shaft 2 from the front end of the input shaft 2 and touches the input side bearing housing 4. Then, the input side housing lid 3 and the input side bearing housing 4 are fixed by screwing bolts after interposing the oil seal 25 and the retaining ring 26.

Finally, the output shaft 13, previously inserted into the output side bearing housing 14 through the ball bearing 54, is fixed to the output side swash plate 12 by screwing bolts.

As the above mentioned, with regard to the hydraulic stepless transmission 1 of this embodiment, the power generated by the input side plungers 8 and acting along the axial direction of the input shaft 2 is transmitted to only the input shaft 2 through the input side swash plate 6 and the input side conical bearing 21. The power generated by the output side plungers 10 and acting along the axial direction of the input shaft 2 is transmitted to only the input shaft 2 through the output side swash plate 12 and the output side conical bearing 51.

According to this construction, the power generated by the input side plungers 8 and the output side plungers 10 along the axial direction of the input shaft 2 does not cause any friction of the transmission casing to which the hydraulic stepless transmission 1 is attached, thereby reducing noise.

Hereinafter, explanation will be given in detail on the closed hydraulic circuit of the hydraulic stepless transmission 1 and the speed change mechanism by pressure oil in the closed hydraulic circuit according to FIGS. 2, 3, 9, 10, 11 and 12.

As shown in FIGS. 2 and 3, in the cylinder block 7 of the hydraulic stepless transmission 1, the closed hydraulic circuit is formed which comprises the input side plunger holes 31, the input side spool valve holes 32, the communication holes 33, the input side oil chamber 35, the confluence part 36, the output side plunger holes 41, the output side spool valve holes 42, the communication holes 43, the output side oil chamber 45, the confluence part 46 and the like.

The input side plunger holes 31 are communicated with the input side oil chamber 35 and the output side oil chamber 45 through the communication holes 33 and the input side spool valve holes 32. The output side plunger holes 41 are communicated with the input side oil chamber 35 and the output side oil chamber 45 through the communication holes 43 and the output side spool valve holes 42. Accordingly, the closed hydraulic circuit communicates the input side plunger holes 31 with the output side plunger holes 41.

In addition, with regard to the hydraulic stepless transmission 1 of this embodiment in the below explanation, the clockwise rotation (right rotation) of the input shaft 2 in the axial front view is referred to as "forward rotation". The input side swash plate 6 is supposed to be rotated upward and downward (to be changed the slant angle of the perpendicular of the swash plate surface 6a of the input side swash plate 6 upward and downward against the axis of the input shaft 2). For convenience of the explanation, the input shaft 2 is supposed to be rotated forward in a fixed rotation speed substantially (Nin>0).

With regard to a projection amount LPin of each of the input side plungers 8 from the cylinder block 7 and a projection amount LPout of each of the output side plungers 10 from the cylinder block 7, the side of projection amount of the plunger projected out from the cylinder block 7 is referred to as "positive", and the side of projection amount of the plunger inserted into the cylinder block 7 is referred to as "negative".

With regard to a projection amount LSin of each of the input side spool valves 9 from the cylinder block 7 and a projection amount LSout of each of the output side spool valves 11 from the cylinder block 7, the position at which the spool valve blocks both the input side oil chamber 35 and the output side oil chamber 45 (neutral position) is referred to as zero, and the side of projection amount of the spool valve projected out from the cylinder block 7 is referred to as "positive", and the side of projection amount of the spool valve inserted into the cylinder block 7 is referred to as "negative".

Figure 9:
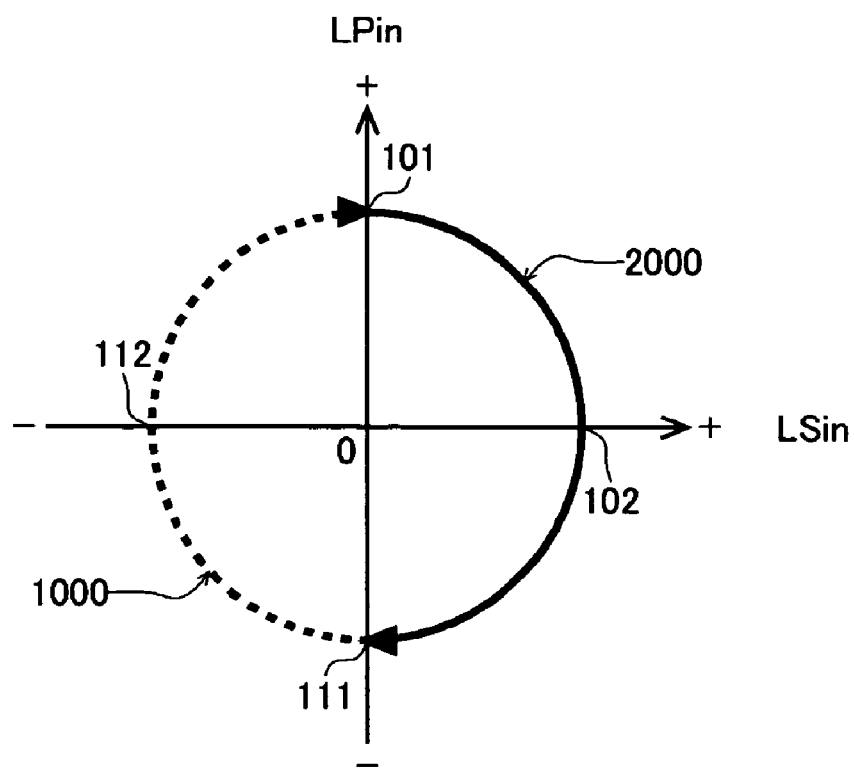
FIG. 9 is a schematic diagram of flow of pressure oil in a closed hydraulic circuit at the time of acceleration operation.
Figure 9:
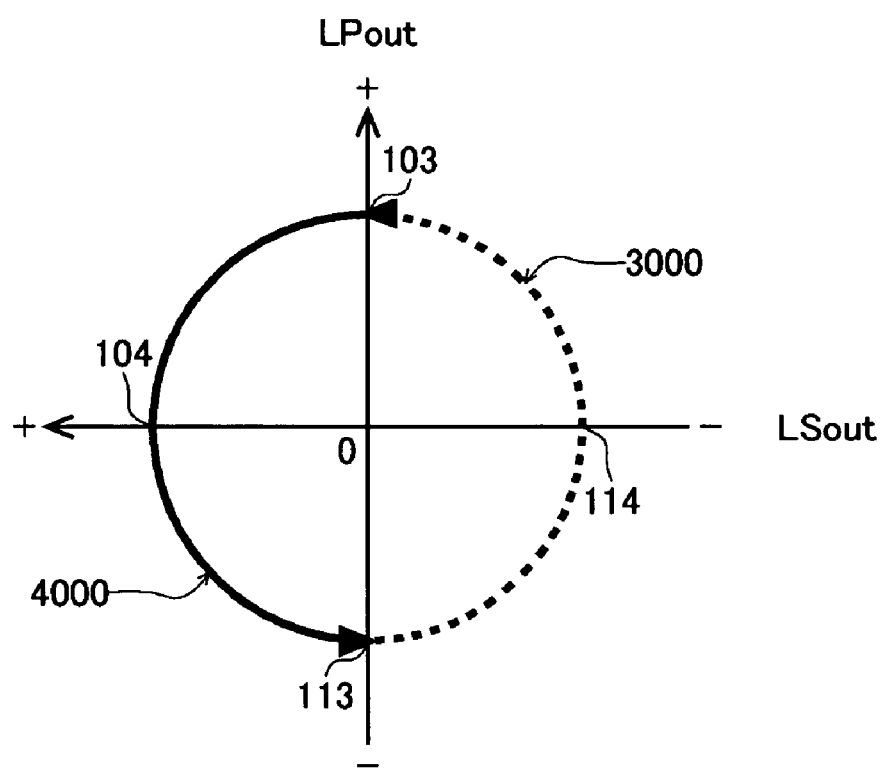
Figure 10:
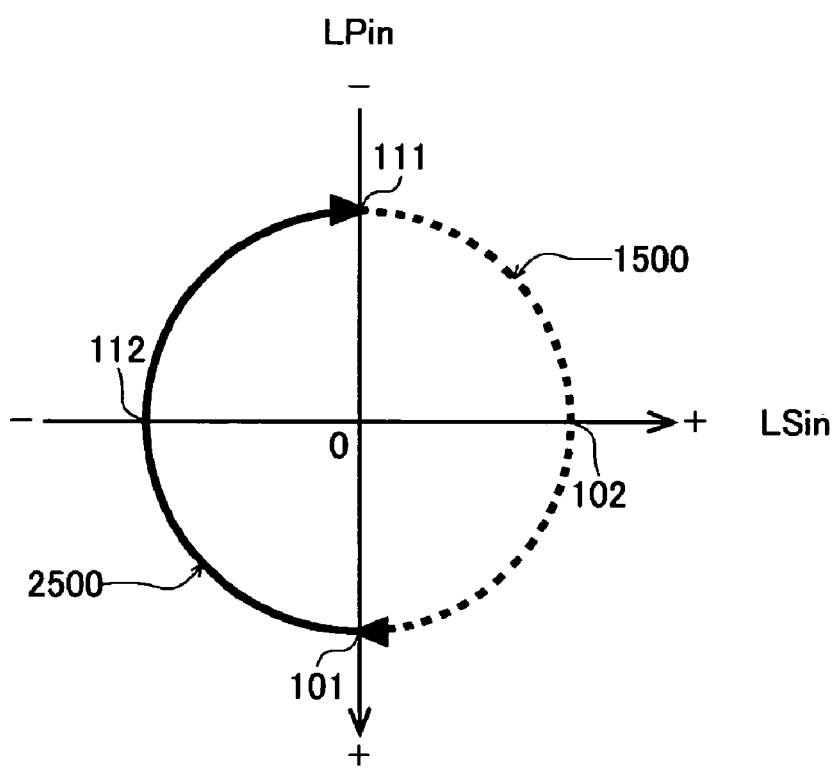
FIG. 10 is a schematic diagram of flow of pressure oil in the closed hydraulic circuit at the time of slowdown operation.
Figure 10:
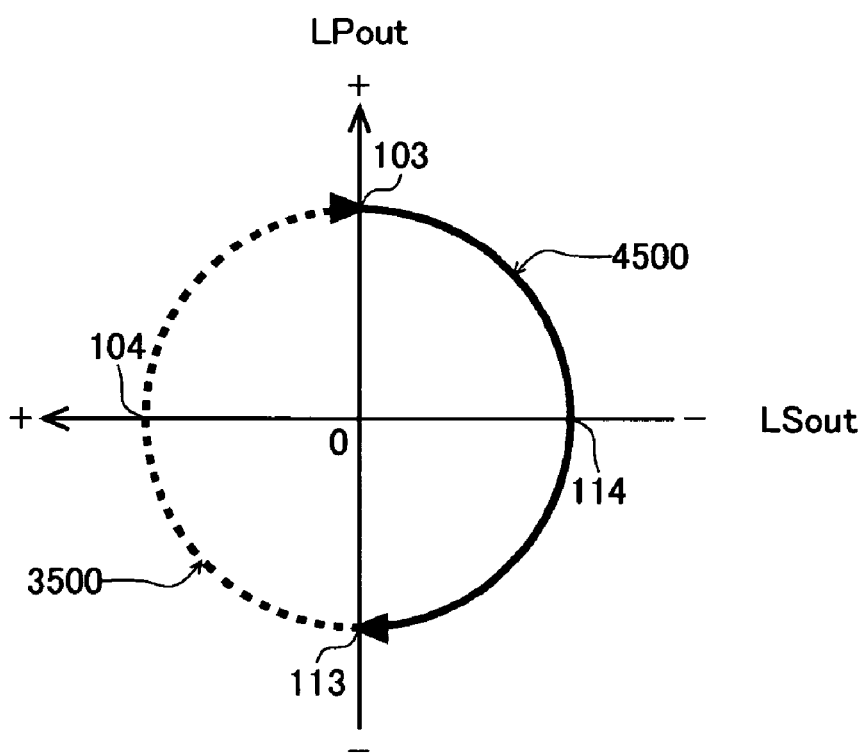

As shown in FIGS. 9 and 10, the position at which the projection amount of the input side spool valve 9 from the cylinder block 7 becomes the maximum (top dead point 102 of the input side spool valve 9) is on the right of the hydraulic stepless transmission 1 in the axial front view of the input shaft 2. The position at which the projection amount of the input side spool valve 9 from the cylinder block 7 becomes the minimum (bottom dead point 112 of the input side spool valve 9) is on the left of the hydraulic stepless transmission 1 in the axial front view of the input shaft 2.

The position at which the projection amount of the output side spool valve 11 from the cylinder block 7 becomes the maximum (top dead point 104 of the output side spool valve 11) is rotated counterclockwise (leftward) for 90° from the position at which the swash plate surface 12a of the output side swash plate 12 becomes farthest from the cylinder block 7 (the position at which the output side plunger 10 is the most projected from the cylinder block 7) in the axial front view of the input shaft 2. The position at which the projection amount of the output side spool valve 11 from the cylinder block 7 becomes the minimum (bottom dead point 114 of the output side spool valve 11) is rotated clockwise (rightward) for 90° from the position at which the swash plate surface 12a of the output side swash plate 12 becomes farthest from the cylinder block 7 (the position at which the output side plunger 10 is the most projected from the cylinder block 7) in the axial front view of the input shaft 2.

Hereinafter, explanation will be given in detail on the flow of pressure oil in the closed hydraulic circuit at the time of "acceleration operation" (speed change operation that, when the rotation speed of the input shaft 2 is designated by Nin and the rotation speed of the output shaft 13 is designated by Nout, the relation thereof is to be "|Nin|<|Nout|") according to FIG. 9.

Under the acceleration operation, the input side swash plate 6 is rotated so that a top dead point 101 of the input side plunger 8 is positioned in the upper part of the hydraulic stepless transmission 1.

FIG. 9(a) shows the positional relation between the projection amount LPin of the input side plunger 8 and the projection amount LSin of the input side spool valve 9, the rotation direction of the cylinder block 7 (the input shaft 2) against the input side swash plate 6, and the flow of pressure oil in the closed hydraulic circuit concerning the input side plunger 8 in the axial front view of the input shaft 2.

When the input side plunger 8 is rotated from a bottom dead point 111 to the top dead point 101 (that is, the input side plunger 8 passes a section 1000 indicated by an arrow of a thick dotted line in FIG. 9(a), and the input side plunger 8 is projected from the cylinder block 7), the input side spool valve 9 is moved to the side of the bottom dead point 112 of the input side spool valve 9. Accordingly, the input side plunger hole 31 is communicated with the input side oil chamber 35, and pressure oil flows from the input side oil chamber 35 into the input side plunger hole 31.

When the input side plunger 8 is rotated from the top dead point 101 to the bottom dead point 111 (that is, the input side plunger 8 passes a section 2000 indicated by an arrow of a thick solid line in FIG. 9(a), and the input side plunger 8 is inserted into the cylinder block 7), the input side spool valve 9 is moved to the side of the top dead point 102 of the input side spool valve 9. Accordingly, the input side plunger hole 31 is communicated with the output side oil chamber 45, and pressure oil is discharged from the input side plunger hole 31 to the output side oil chamber 45.

Figure 11:
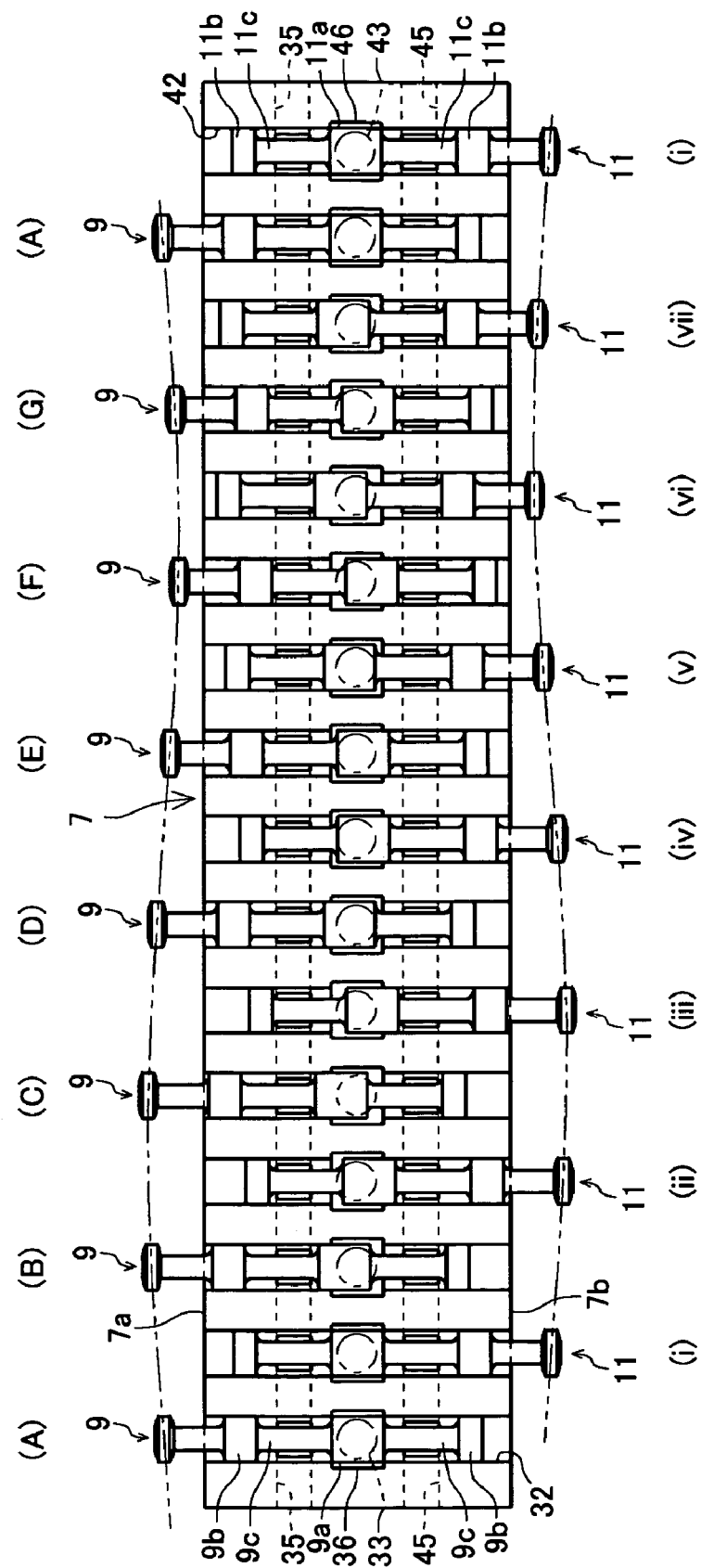
FIG. 11 is a schematic development of the cylinder block.

According to FIG. 11, the input side spool valves 9, corresponding to the input side plunger holes 31 discharging pressure oil, position at (B), (C) and (D). The input side spool valves 9, corresponding to the input side plunger holes 31 into which pressure oil is flowing, position at (E), (F) and (G). In addition, the input side spool valve 9 at (A) is just at the neutral position, and the input side plunger hole 31 corresponding to this input side spool valve 9 is blocked from the closed hydraulic circuit.

As the above mentioned, in the closed hydraulic circuit concerning the input side plunger 8 under the acceleration operation, pressure oil flows from the input side oil chamber 35 into some input side plunger holes 31, and pressure oil is discharged from another input side plunger holes 31 to the output side oil chamber 45.

FIG. 9(b) shows the positional relation between the projection amount LPout of the output side plunger 10 and the projection amount LSout of the output side spool valve 11, the rotation direction of the cylinder block 7 (the input shaft 2) against the output side swash plate 12, and the flow of pressure oil in the closed hydraulic circuit concerning the output side plunger 10 in the axial front view of the input shaft 2.

In addition, under the acceleration operation, the rotation direction of the output shaft 13 is the same as that of the input shaft 2, and the rotation speed of the output shaft 13 is larger than that of the input shaft 2 (|Nin|<|Nout|). Accordingly, based on the output side swash plate 12, the cylinder block 7 is rotated relatively reversely (counterclockwise).

When the output side plunger 10 is rotated from a bottom dead point 113 to a top dead point 103 (that is, the output side plunger 10 passes a section 3000 indicated by an arrow of a thick dotted line in FIG. 9(b), and the output side plunger 10 is projected from the cylinder block 7), the output side spool valve 11 is moved to the side of the bottom dead point 114 of the output side spool valve 11. Accordingly, the output side plunger hole 41 is communicated with the output side oil chamber 45, and pressure oil flows from the output side oil chamber 45 into the output side plunger hole 41.

When the output side plunger 10 is rotated from the top dead point 103 to the bottom dead point 113 (that is, the output side plunger 10 passes a section 4000 indicated by an arrow of a thick solid line in FIG. 9(b), and the output side plunger 10 is inserted into the cylinder block 7), the output side spool valve 11 is moved to the side of the top dead point 104 of the output side spool valve 11. Accordingly, the output side plunger hole 41 is communicated with the input side oil chamber 35, and pressure oil is discharged from the output side plunger hole 41 to the input side oil chamber 35.

According to FIG. 11, the output side spool valves 11, corresponding to the output side plunger holes 41 discharging pressure oil, position at (ii), (iii) and (iv). The output side spool valves 11, corresponding to the output side plunger holes 41 into which pressure oil is flowing, position at (v), (vi) and (vii). In addition, the output side spool valve 11 at (i) is just at the neutral position, and the output side plunger hole 41 corresponding to this output side spool valve 11 is blocked from the closed hydraulic circuit.

As the above mentioned, in the closed hydraulic circuit concerning the output side plunger 10 under the acceleration operation, pressure oil flows from the output side oil chamber 45 into some output side plunger holes 41, and pressure oil is discharged from another output side plunger holes 41 to the input side oil chamber 35.

Figure 12:
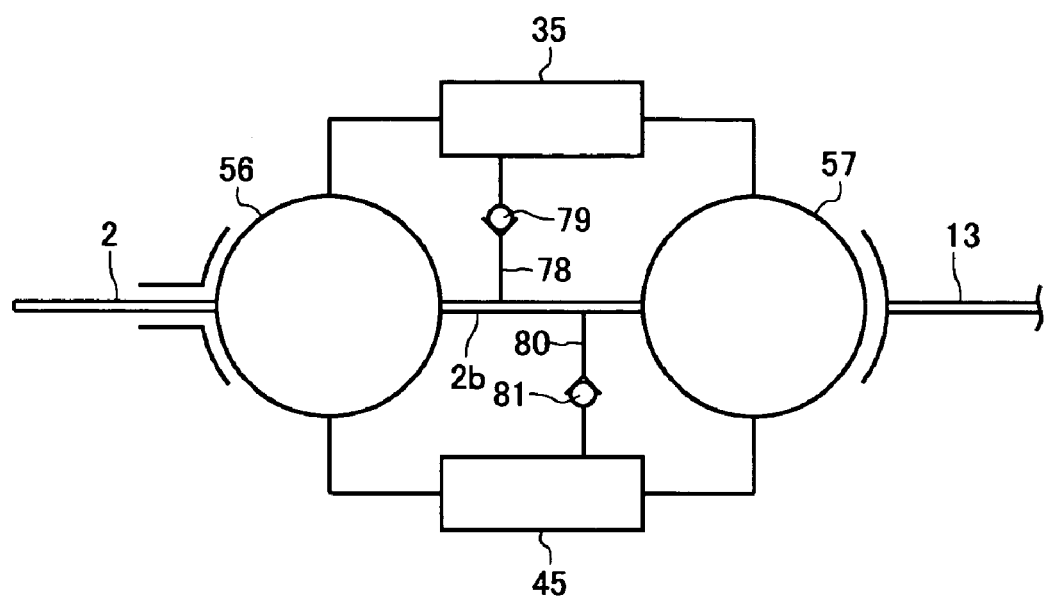
FIG. 12 is a schematic diagram of the closed hydraulic circuit of the hydraulic equipment according to the present invention.

Accordingly, in the closed hydraulic circuit in the cylinder block 7 under the acceleration operation, as shown in FIG. 12, pressure oil passes through an input side hydraulic equipment 56, the input side oil chamber 35, an output side hydraulic equipment 57, the output side oil chamber 45, and the input side hydraulic equipment 56 in this order (more exactly, pressure oil passes through the input side plunger holes 31, the communication holes 33, the confluence part 36, the input side spool valve holes 32, the input side oil chamber 35, the output side spool valve holes 42, the communication holes 43, and the output side plunger holes 41 in this order, and pressure oil passes through the output side plunger holes 41, the communication holes 43, the output side spool valve holes 42, the output side oil chamber 45, the input side spool valve holes 32, the confluence part 36, the communication holes 33, and the input side plunger holes 31 in this order). In addition, the input side hydraulic equipment 56 comprises the input side plungers 8, the input side spool valves 9 and the mechanism driving them reciprocally. The output side hydraulic equipment 57 comprises the output side plungers 10, the output side spool valves 11 and the mechanism driving them reciprocally.

Hereinafter, explanation will be given in detail on the flow of pressure oil in the closed hydraulic circuit at the time of "deceleration operation" (speed change operation that, when the rotation speed of the input shaft 2 is designated by Nin and the rotation speed of the output shaft 13 is designated by Nout, the relation thereof is to be "|Nin|>|Nout|") according to FIG. 10.

Under the deceleration operation, the input side swash plate 6 is rotated so that a top dead point 101 of the input side plunger 8 is positioned in the lower part of the hydraulic stepless transmission 1.

FIG. 10(a) shows the positional relation between the projection amount LPin of the input side plunger 8 and the projection amount LSin of the input side spool valve 9, the rotation direction of the cylinder block 7 (the input shaft 2) against the input side swash plate 6, and the flow of pressure oil in the closed hydraulic circuit concerning the input side plunger 8 in the axial front view of the input shaft 2.

When the input side plunger 8 is rotated from a bottom dead point 111 to the top dead point 101 (that is, the input side plunger 8 passes a section 1500 indicated by an arrow of a thick dotted line in FIG. 10(a), and the input side plunger 8 is projected from the cylinder block 7), the input side spool valve 9 is moved to the side of the top dead point 102 of the input side spool valve 9. Accordingly, the input side plunger hole 31 is communicated with the output side oil chamber 45, and pressure oil flows from the output side oil chamber 45 into the input side plunger hole 31.

When the input side plunger 8 is rotated from the top dead point 101 to the bottom dead point 111 (that is, the input side plunger 8 passes a section 2500 indicated by an arrow of a thick solid line in FIG. 10(a), and the input side plunger 8 is inserted into the cylinder block 7), the input side spool valve 9 is moved to the side of the bottom dead point 112 of the input side spool valve 9. Accordingly, the input side plunger hole 31 is communicated with the input side oil chamber 35, and pressure oil is discharged from the input side plunger hole 31 to the input side oil chamber 35.

According to FIG. 11, the input side spool valves 9, corresponding to the input side plunger holes 31 discharging pressure oil, position at (E), (F) and (G). The input side spool valves 9, corresponding to the input side plunger holes 31 into which pressure oil is flowing, position at (B), (C) and (D). In addition, the input side spool valve 9 at (A) is just at the neutral position, and the input side plunger hole 31 corresponding to this input side spool valve 9 is blocked from the closed hydraulic circuit.

As the above mentioned, in the closed hydraulic circuit concerning the input side plunger 8 under the deceleration operation, pressure oil flows from the output side oil chamber 45 into some input side plunger holes 31, and pressure oil is discharged from another input side plunger holes 31 to the input side oil chamber 35.

FIG. 10(b) shows the positional relation between the projection amount LPout of the output side plunger 10 and the projection amount LSout of the output side spool valve 11, the rotation direction of the cylinder block 7 (the input shaft 2) against the output side swash plate 12, and the flow of pressure oil in the closed hydraulic circuit concerning the output side plunger 10 in the axial front view of the input shaft 2.

In addition, under the deceleration operation, the rotation direction of the output shaft 13 is the same as that of the input shaft 2, and the rotation speed of the output shaft 13 is smaller than that of the input shaft 2 (|Nin|>|Nout|). Accordingly, based on the output side swash plate 12, the cylinder block 7 is rotated relatively forwardly (clockwise).

When the output side plunger 10 is rotated from a bottom dead point 113 to a top dead point 103 (that is, the output side plunger 10 passes a section 3500 indicated by an arrow of a thick dotted line in FIG. 10(b), and the output side plunger 10 is projected from the cylinder block 7), the output side spool valve 11 is moved to the side of the top dead point 104 of the output side spool valve 11. Accordingly, the output side plunger hole 41 is communicated with the input side oil chamber 35, and pressure oil flows from the input side oil chamber 35 into the output side plunger hole 41.

When the output side plunger 10 is rotated from the top dead point 103 to the bottom dead point 113 (that is, the output side plunger 10 passes a section 4500 indicated by an arrow of a thick solid line in FIG. 10(b), and the output side plunger 10 is inserted into the cylinder block 7), the output side spool valve 11 is moved to the bottom side of the bottom dead point 114 of the output side spool valve 11. Accordingly, the output side plunger hole 41 is communicated with the output side oil chamber 45, and pressure oil is discharged from the output side plunger hole 41 to the output side oil chamber 45.

According to FIG. 11, the output side spool valves 11, corresponding to the output side plunger holes 41 discharging pressure oil, position at (v), (vi) and (vii). The output side spool valves 11, corresponding to the output side plunger holes 41 into which pressure oil is flowing, position at (ii), (iii) and (iv). In addition, the output side spool valve 11 at (i) is just at the neutral position, and the output side plunger hole 41 corresponding to this output side spool valve 11 is blocked from the closed hydraulic circuit.

As the above mentioned, in the closed hydraulic circuit concerning the output side plunger 10 under the deceleration operation, pressure oil flows from the input side oil chamber 35 into some output side plunger holes 41, and pressure oil is discharged from another output side plunger holes 41 to the output side oil chamber 45.

Accordingly, in the closed hydraulic circuit in the cylinder block 7 under the deceleration operation, as shown in FIG. 12, pressure oil passes through an input side hydraulic equipment 56, the output side oil chamber 45, an output side hydraulic equipment 57, the input side oil chamber 35, and the input side hydraulic equipment 56 in this order (more exactly, pressure oil passes through the input side plunger holes 31, the communication holes 33, the confluence part 36, the input side spool valve holes 32, the output side oil chamber 45, the output side spool valve holes 42, the communication holes 43, and the output side plunger holes 41 in this order, and pressure oil passes through the output side plunger holes 41, the communication holes 43, the output side spool valve holes 42, the input side oil chamber 35, the input side spool valve holes 32, the confluence part 36, the communication holes 33, and the input side plunger holes 31 in this order).

Hereinafter, explanation will be given in detail on the flow of pressure oil in the closed hydraulic circuit at the time of "uniform operation" (speed change operation that, when the rotation speed of the input shaft 2 is designated by Nin and the rotation speed of the output shaft 13 is designated by Nout, the relation thereof is to be "|Nin|=|Nout|") according to FIGS. 2 and 12.

Under the uniform operation, the input side swash plate 6 is rotated so as to make the swash plate surface 6a of the input side swash plate 6 in parallel to the input side end surface 7a (that is, to make the swash plate surface 6a of the input side swash plate 6 rectangular to the axis of the input shaft 2).

In this case, the input side plungers 8 are not moved reciprocally even if the cylinder block 7 is rotated relatively against the input side swash plate 6, whereby the input side plungers 8 do not make pressure oil flow. Namely, in FIG. 12, the circulation of pressure oil in the hydraulic circuit is stopped.

Even if the output shaft 13 pretends to be rotated against the cylinder block 7 for the acceleration under the uniform operation, the circulation of pressure oil is stopped, whereby the output side plungers 10 pretending to discharge the pressure oil cannot be moved axially.

Similarly, even if the output shaft 13 pretends to be rotated against the cylinder block 7 for the deceleration, the circulation of pressure oil is stopped, whereby the output side plungers 10 pretending to discharge the pressure oil cannot be moved axially.

Accordingly, under the uniform operation, the output shaft 13 cannot be rotated relatively against the cylinder block 7, whereby the input shaft 2 and the output shaft 13 are rotated integrally (on the same direction and in the same rotation speed).

Hereinafter, explanation will be given on the speed change action of the hydraulic stepless transmission 1 according to FIGS. 12 and 13.

The hydraulic stepless transmission 1 of the present invention can change ratio of the rotation speed of the output shaft 13 to that of the input shaft 2 (Nout/Nin) within the range of slant angle of the swash plate surface 6a possible for the input side swash plate 6 (stepless speed change).

Figure 13:
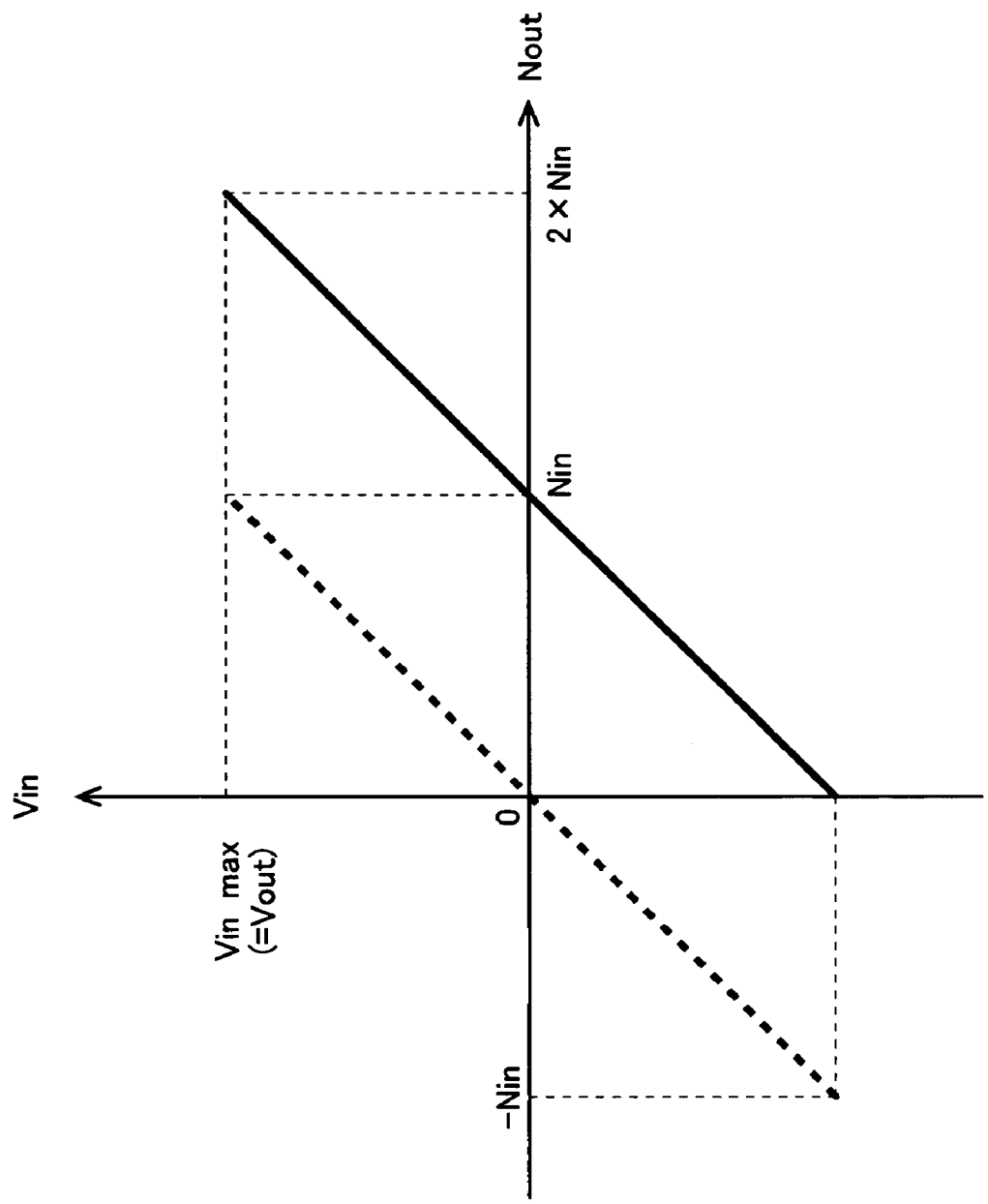
FIG. 13 is a diagram of relation between stroke volume of an input side hydraulic equipment and rotation speed of an output shaft of the hydraulic equipment according to the present invention.
Figure 14:
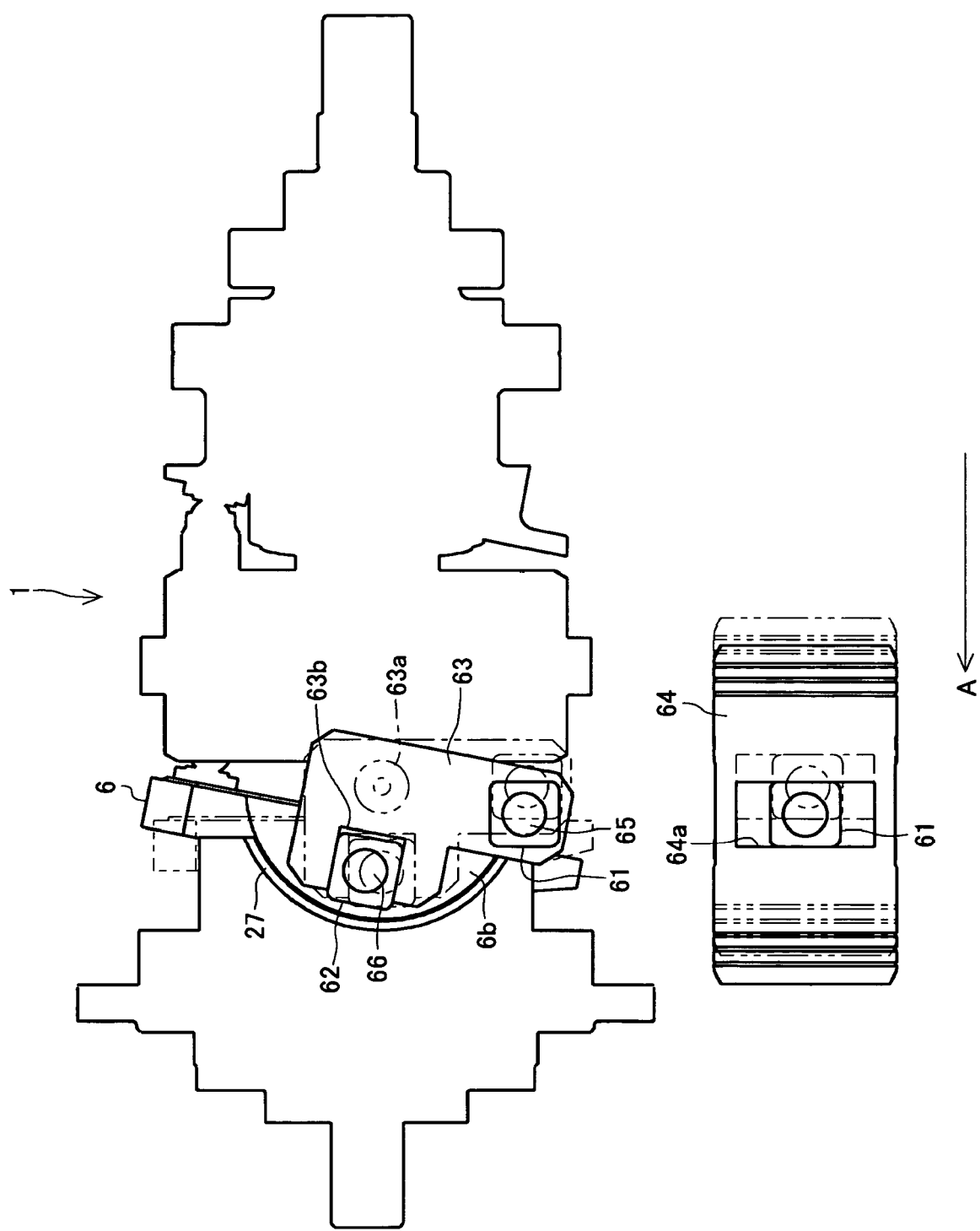
FIG. 14 is a side view of a link arm.
Figure 15:
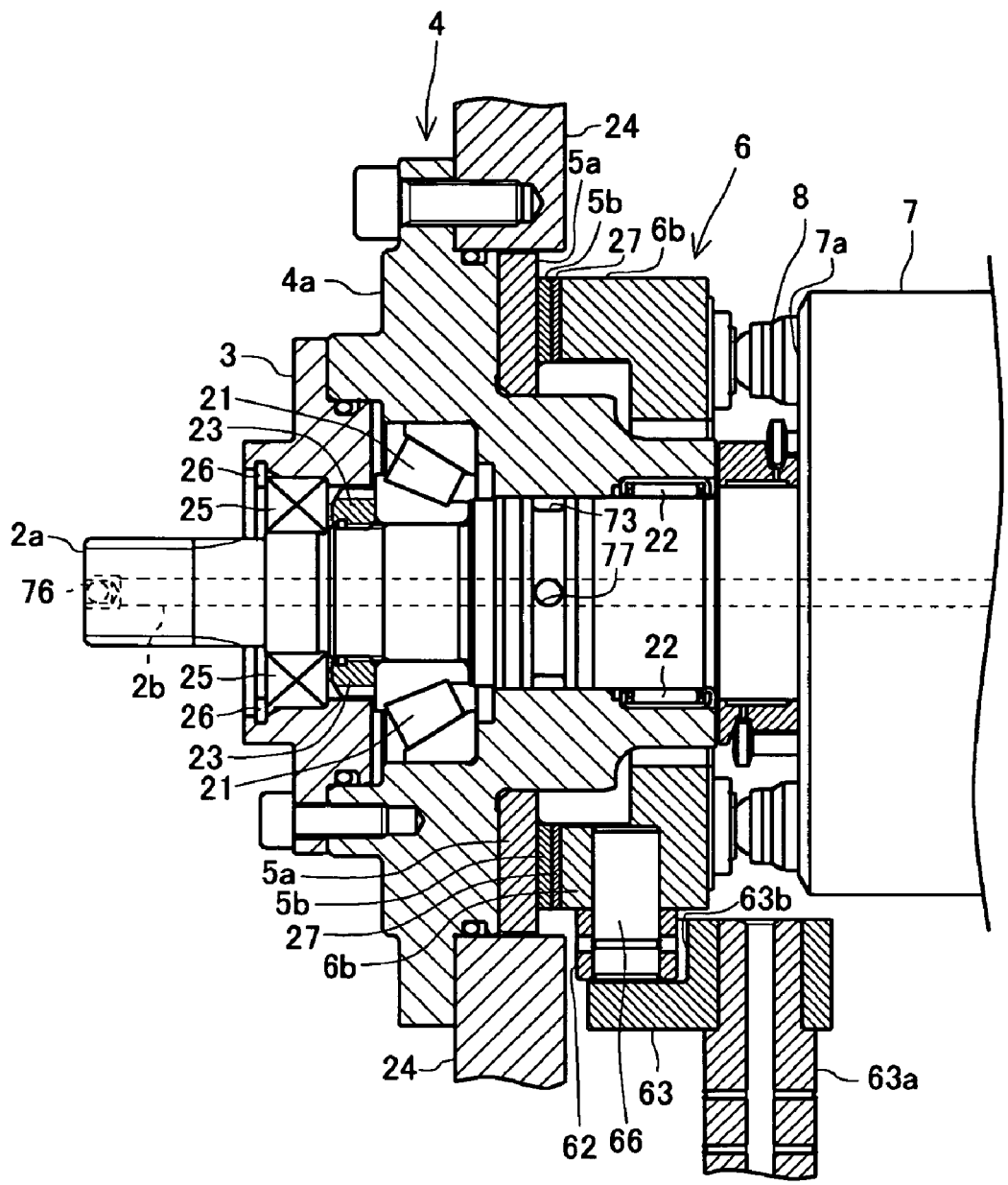
FIG. 15 is a plan view partially in section of the link arm.
Figure 15:
Figure 16:
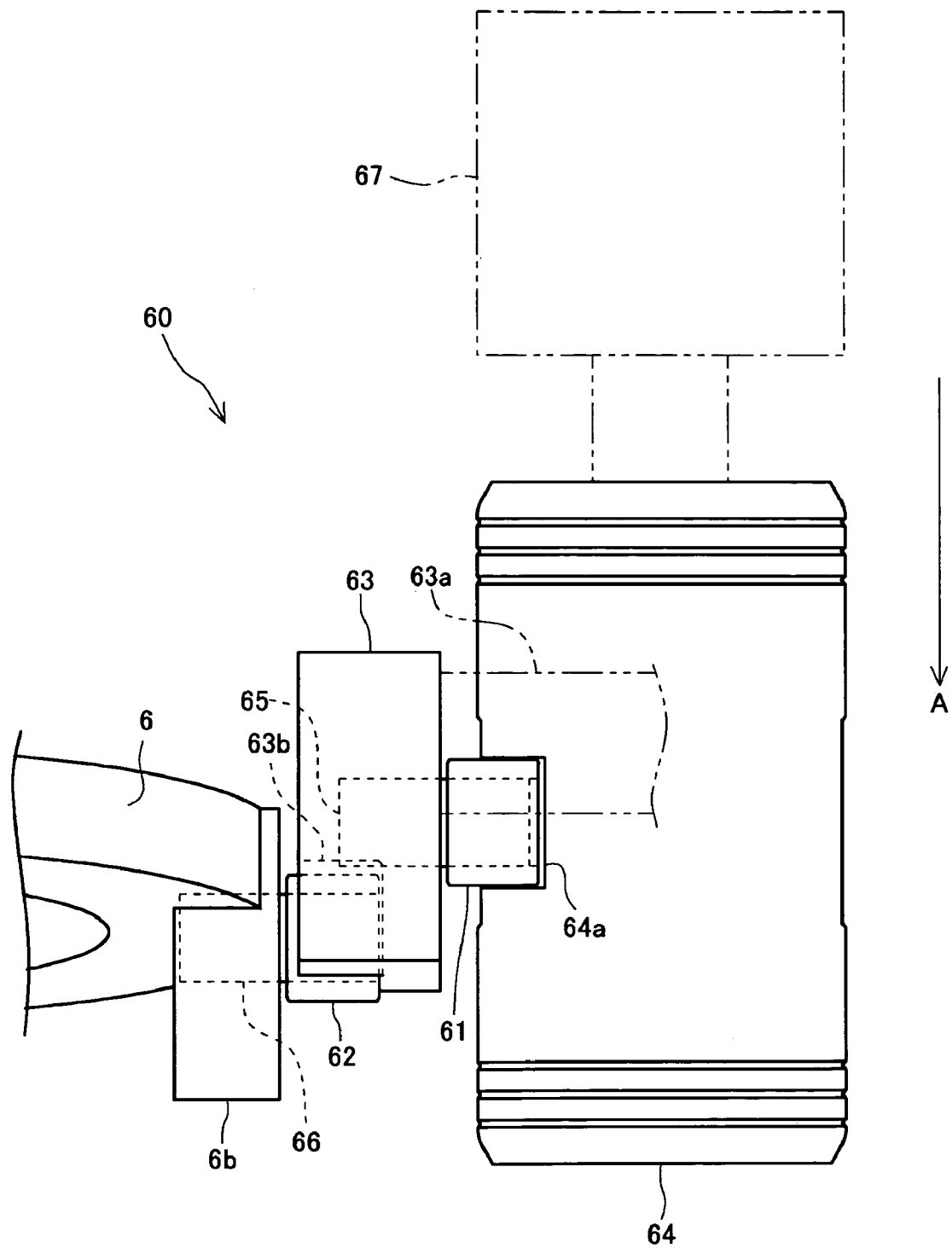
FIG. 16 is a schematic plan view of a link arm mechanism.

In addition, a normal HST indicated by an arrow of a thick dotted line in FIG. 13 is a HST (Hydro Static Transmission) comprising a hydraulic pump (input side hydraulic equipment) and a hydraulic motor (output side hydraulic equipment), which are constructed substantially the same. With regard to the "normal HST", the hydraulic motor is fixed type that a swash plate thereof has a fixed slant angle, and a slant angle of a swash plate of the hydraulic pump is the same as that of the hydraulic motor in the absolute value and is changeable to be positive or negative.

With regard to the normal HST, the rotation speed Nout of the output shaft is formularized in below Formula 1 with the rotation speed Nin of the input shaft, a stroke volume Vin of the input side hydraulic equipment and a stroke volume Vout of the output side hydraulic equipment.

$$Nout=Nin*(Vin/Vout) \quad \text{(Formula 1)}$$

In addition, when the normal HST is connected to an engine or another driving source without interposing a mechanism changing the rotation direction forward or rearward, the rotation speed Nin of the input shaft in the Formula 1 is zero or positive. The stroke volume Vin of the input side hydraulic equipment is a volume of pressure oil pressingly sent from the input side hydraulic equipment to the output side hydraulic equipment by one rotation of the input shaft. The stroke volume Vout of the output side hydraulic equipment is a volume of pressure oil pressingly sent from the output side hydraulic equipment to the input side hydraulic equipment by one rotation of the output shaft. The stroke volume Vin of the input side hydraulic equipment is varied in the absolute value corresponding to the slant angle of the input side swash plate and changed to be positive or negative corresponding to the pressing direction in the hydraulic circuit. On the other hand, the stroke volume Vout of the output side hydraulic equipment is a positive fixed number because the slant angle of the output side swash plate is fixed.

As shown in the Formula 1, when the stroke volume Vin of the input side hydraulic equipment of the normal HST is zero, that is, when the slant angle of the input side swash plate is rectangular to the axis of the rotary shaft of the cylinder block so that pressure oil is not pressingly sent even if the input side hydraulic equipment is rotated, the rotation speed Nout of the output shaft of the output side hydraulic equipment is also zero.

When the swash plate of the input side hydraulic equipment of the normal HST is slanted to the forward rotation side (so as to make the rotation direction of the input shaft the same as that of the output shaft) and the stroke volume Vin is increased in the absolute value while being kept in positive, the rotation speed Nout of the output shaft is increased in the absolute value proportionally to the stroke volume Vin while being kept in positive. When the swash plate of the input side hydraulic equipment of the normal HST is slanted to the rearward rotation side (so as to make the rotation direction of the input shaft opposite to that of the output shaft) and the stroke volume Vin is increased in the absolute value while being kept in negative, the rotation speed Nout of the output shaft is increased in the absolute value proportionally to the stroke volume Vin while being kept in negative.

Accordingly, as shown in a thick dotted line in FIG. 13, the rotation speed Nout of the output shaft of the normal HST is within the relation "−Nin≦Nout≦Nin" while the rotation speed of the input shaft is referred to as Nin.

On the other hand, with regard to the hydraulic stepless transmission 1 of the present invention, the rotation speed Nout of the output shaft 13 is formularized in below Formulas 2, 3 and 4 with the rotation speed Nin of the input shaft 2, a relational rotation speed Nr of the output shaft 13 against the cylinder block 7, the stroke volume Vin of the input side hydraulic equipment 56 and the stroke volume Vout of the output side hydraulic equipment 57.

$$Nout=Nin+Nr \quad \text{(Formula 2)}$$

$$Nr=Nin*(Vin/Vout) \quad \text{(Formula 3)}$$

$$Nout=Nin*(1+Vin/Vout) \quad \text{(Formula 4)}$$

In addition, when the hydraulic stepless transmission 1 is connected to an engine or another driving source without interposing a mechanism changing the rotation direction forward or rearward, the rotation speed Nin of the input shaft 2 in the Formulas 2, 3 and 4 is zero or positive. The relational rotation speed Nr of the output shaft 13 against the cylinder block 7 is positive when the output shaft 13 is rotated forward against the cylinder block 7, and is negative when the output shaft 13 is rotated reversely against the cylinder block 7. The stroke volume Vin of the input side hydraulic equipment 56 is a volume of pressure oil pressingly sent from the input side hydraulic equipment 56 to the output side hydraulic equipment 57 by one rotation of the input shaft 2. The stroke volume Vout of the output side hydraulic equipment 57 is a volume of pressure oil pressingly sent from the output side hydraulic equipment 57 to the input side hydraulic equipment 56 by one rotation of the output shaft 13 relative to the input shaft 2. The stroke volume Vin of the input side hydraulic equipment 56 is varied in the absolute value corresponding to the slant angle of the input side swash plate 6 and changed to be positive or negative corresponding to the pressing direction in the hydraulic circuit. On the other hand, the stroke volume Vout of the output side hydraulic equipment 57 is a positive fixed number because the slant angle of the output side swash plate 12 is fixed. Furthermore, the slant angle of the output side swash plate 12 is the same as the maximum absolute value of the slant angle of the input side swash plate 6, whereby the formula "|Vin max|=Vout" is materialized.

As shown in the Formulas 2, 3 and 4, when the stroke volume Vin of the input side hydraulic equipment 56 is zero, that is, when the swash plate surface 6a of the input side swash plate 6 is rectangular to the axis of the rotary shaft of the cylinder block 7 (input shaft 2) so that pressure oil is not pressingly sent even if the input side hydraulic equipment 56 is rotated, the rotation speed Nout of the output shaft 13 of the output side hydraulic equipment 57 is the same as the rotation speed Nin of the input shaft 2.

When the input side swash plate 6 is slanted to the acceleration side (so as to make the rotation direction of the input shaft 2 the same as that of the output shaft and make Nin smaller than Nout) and the stroke volume Vin is increased in the absolute value while being kept in positive, the relational rotation speed Nr of the output shaft 13 against the cylinder block 7 is increased in the absolute value proportionally to the stroke volume Vin while being kept in positive. When the input side swash plate 6 is slanted to the deceleration side (so as to make the rotation direction of the input shaft 2 opposite to that of the output shaft and make Nin larger than Nout) and the stroke volume Vin is increased in the absolute value while being kept in negative, the relational rotation speed Nr of the output shaft 13 against the cylinder block 7 is increased in the absolute value proportionally to the stroke volume Vin while being kept in negative.

Accordingly, as shown in a thick solid line in FIG. 13, the rotation speed Nout of the output shaft 13 of the hydraulic stepless transmission 1 in this embodiment is within the relation "0≦Nout≦2*Nin" while the rotation speed of the input shaft 2 is referred to as Nin.

As the above mentioned, with regard to the normal HST, the rotation speed of the output shaft is changed to be positive or negative centering on zero while being the same as that of the input shaft in the absolute value (−Nin≦Nout≦Nin) by changing the slant angle of the input side hydraulic equipment. On the contrary, with regard to the hydraulic stepless transmission 1, the rotation speed of the output shaft 13 changes between zero and the twice of Nin centering on Nin (0≦Nout≦2*Nin) by changing the slant angle of the input side swash plate 6.

This construction has merits as mentioned below. When the normal HST is used under the condition that the rotation speed Nout of the output shaft is in the vicinity of Nin, amount of pressure oil circulated in the hydraulic circuit in the HST is large (that is, |Vin| is large).

Accordingly, loss of energy following temperature increase of the pressure oil or leak of the pressure oil from each part of the HST is large.

On the other hand, when the hydraulic stepless transmission 1 in this embodiment is used under the condition that the rotation speed Nout of the output shaft is in the vicinity of Nin, amount of pressure oil circulated in the hydraulic circuit in the hydraulic stepless transmission 1 is small (that is, |Vin| is small). Accordingly, loss of energy following temperature increase of the pressure oil or leak of the pressure oil from each part of the hydraulic stepless transmission 1 is small.

Therefore, by designing that the rotation speed Nin of the input shaft 2 is within the range of the rotation speed of the output shaft with high frequency of use in the case of applying the hydraulic stepless transmission 1, loss of energy of the hydraulic stepless transmission 1 at the time of rotating the output shaft 13 within the range of the rotation speed with high frequency of use is suppressed so as to improve energy efficiency (fuel efficiency).

As the above mentioned, the hydraulic stepless transmission 1, which is the first embodiment of the hydraulic equipment of the present invention, comprises the input shaft 2 which is the first rotary shaft, the output shaft 13 which is the second rotary shaft, the input side plungers 8 which are the first plungers and the output side plungers 10 which are the second plungers moved reciprocally axially, the input side spool valves 9 which are the first spool valves and the output side spool valves 11 which are the second spool valves also moved reciprocally axially, the cylinder block 7 which houses the input side plungers 8, the output side plungers 10, the input side spool valves 9 and the output side spool valves 11 and is rotated integrally with the first rotary shaft 2, the input side swash plate 6 which is the first swash plate and touches the input side plungers 8 at the swash plate surface 6a changeable its slant angle against the axis of the rotary shaft, and the output side swash plate 12 which is the second swash plate and touches the output side plungers 10 at the swash plate surface 12a having the fixed slant angle against the axis of the rotary shaft and is rotated integrally with the output shaft 13. The hydraulic circuit is formed in the cylinder block 7 so as to communicate the input side plunger holes 31 in which the first plungers are housed with the output side plunger holes 41 in which the second plungers are housed. The passage of pressure oil flowing into or out from the input side plunger holes 31 in which the input side plungers 8 are housed is switched by the input side spool valves 9. The passage of pressure oil flowing into or out from the output side plunger holes 41 in which the output side plungers 10 are housed is switched by the output side spool valves 11. The hydraulic stepless transmission 1 has a pair of the spool valve guides comprising the input side spool valve guide 37 on which the guide groove 37b slanted against the axis of the rotary shaft is formed and the output side spool valve guide 47 on which the guide groove 47b also slanted against the axis of the rotary shaft is formed. The input side spool valves 9 are engaged with the input side holder 38 which is a holding member attached to the guide groove 37b. The output side spool valves 11 are engaged with the output side holder 48 which is a holding member attached to the guide groove 47b.

According to this construction, number of the members is reduced to which high dimensional accuracy is required for maintaining the accuracy of the axial reciprocal movement of the input side spool valves 9 and the output side spool valves 11 (in this embodiment, the input side spool valve guide 37, the output side spool valve guide 47 and the cylinder block 7), whereby the manufacturing cost is reduced.

The input side spool valve guide 37 and the cylinder block 7 touch with each other by their surfaces facing mutually (that is, the touching surface 37c and the input side end surface 7a). The output side spool valve guide 47 and the cylinder block 7 touch with each other by their surfaces facing mutually (that is, the touching surface 47c and the output side end surface 7b). These surfaces facing mutually are rectangular to the axis of the input shaft 2. Accordingly, by processing the surfaces facing mutually with high accuracy, the accuracy of the axial reciprocal movement of the input side spool valves 9 and the output side spool valves 11c an be obtained easily, whereby the members can be manufactured easily so as to reduce the manufacturing cost.

Furthermore, the recesses 37a and the salients 4c or the recesses 47a and the salients 12c, which are engaged with each other at their surfaces slanted against the surface rectangular to the axis of the input shaft 2, are formed in the part at which the input side spool valve guide 37 being one of the spool valve guides touches the bearing member pivotally supporting the input shaft 2 (in this embodiment, the input side bearing housing 4) or the part at which the output side spool valve guide 47 being the other spool valve guide touches the member rotated integrally with the output shaft 13 (in this embodiment, the output side swash plate 12). Accordingly, the input side spool valve guide 37 and the output side spool valve guide 47 are applied thereto with power respectively toward the input side end surface 7a and the input side end surface 7b of the cylinder block 7.

Therefore, by processing with high accuracy the surfaces by which the input side spool valve guide 37 and the output side spool valve guide 47 touch the cylinder block 7 (that is, the touching surface 37c, the touching surface 47c, the input side end surface 7a and the input side end surface 7b), the accuracy of the axial reciprocal movement of the input side spool valves 9 and the output side spool valves 11 can be maintained easily, whereby the members can be manufactured easily so as to reduce the manufacturing cost.

Hereinafter, explanation will be given in detail on a link arm mechanism 60, which changed the slant angle of the input side swash plate 6 of the hydraulic stepless transmission 1, according to FIGS. 1, 14, 15, 16, 17 and 18.

With regard to the hydraulic stepless transmission 1, the speed change operation (the operation for changing the ratio of the rotation speed of the output shaft 13 to that of the input shaft 2) is performed by changing the slant angle of the input side swash plate 6. The slant angle of the input side swash plate 6 is changed by the link arm mechanism 60.

The link arm mechanism 60 mainly comprises a first arm engaging member 61, a second arm engaging member 62, a link arm 63, a piston 64, a first engaging pin 65, a second engaging pin 66, and an actuator 67.

Figure 17:
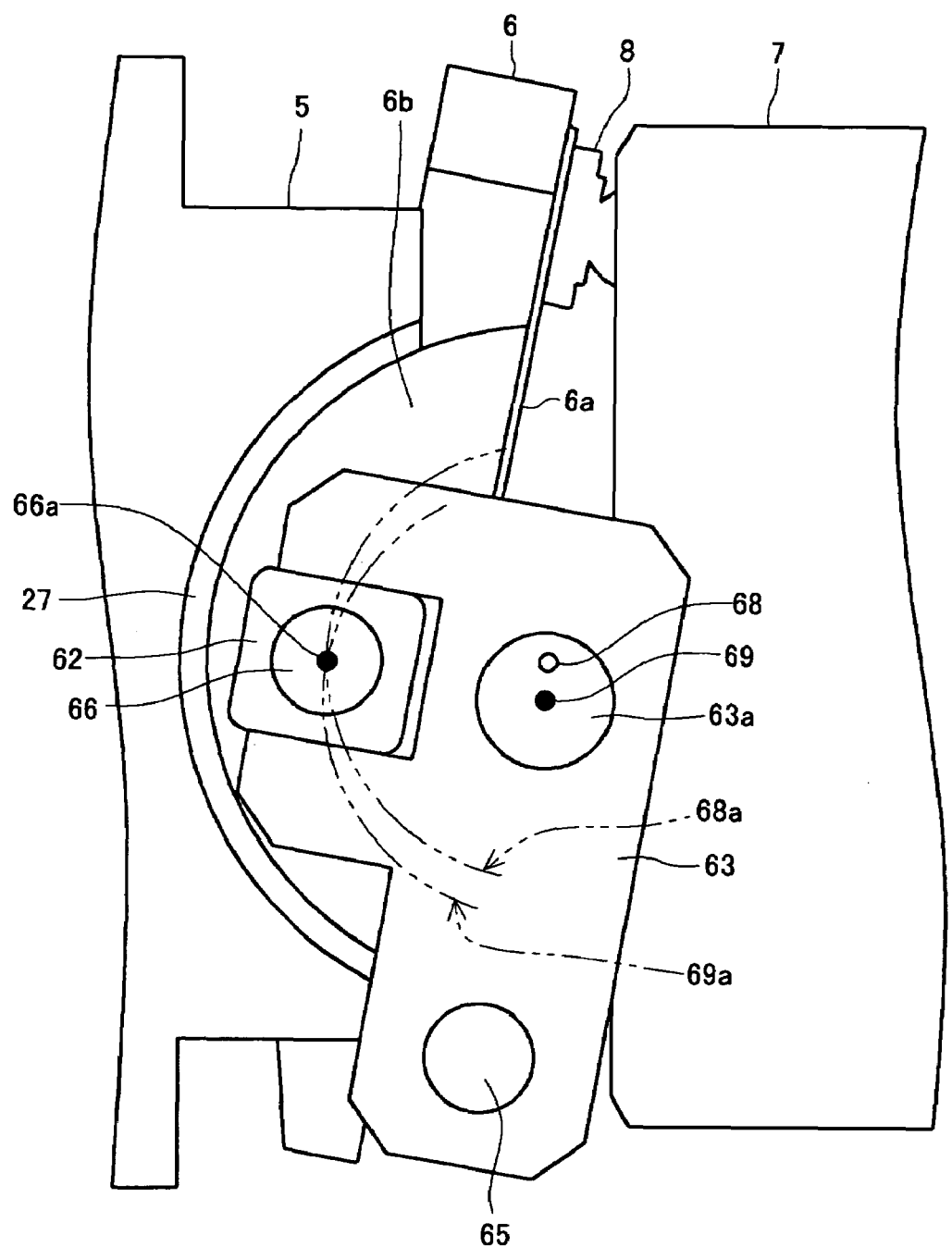
FIG. 17 is a drawing of positional relation between the link arm before rotated and an input side swash plate.
Figure 18:
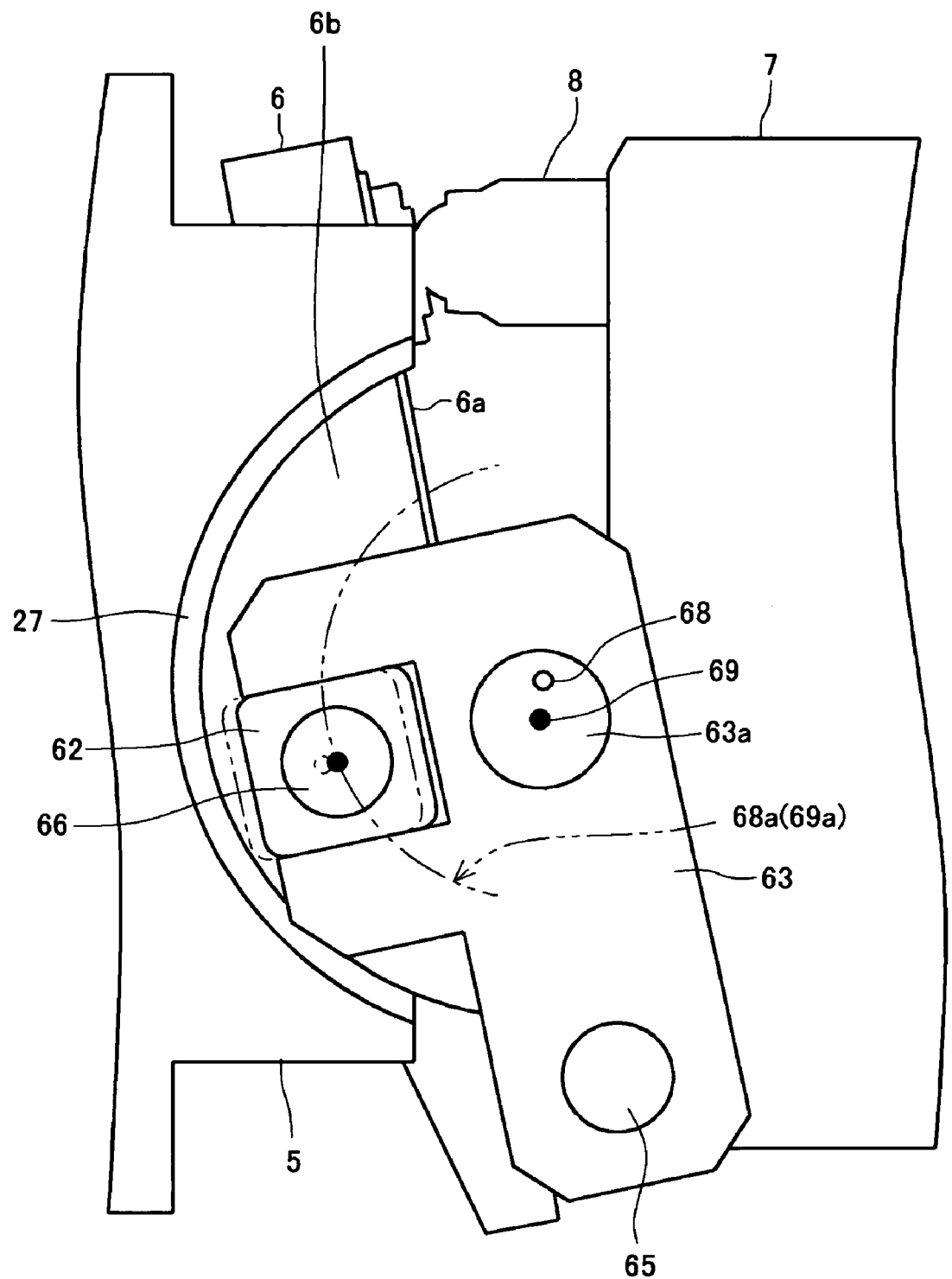
FIG. 18 is a drawing of positional relation between the link arm after rotated and the input side swash plate.
Figure 19:
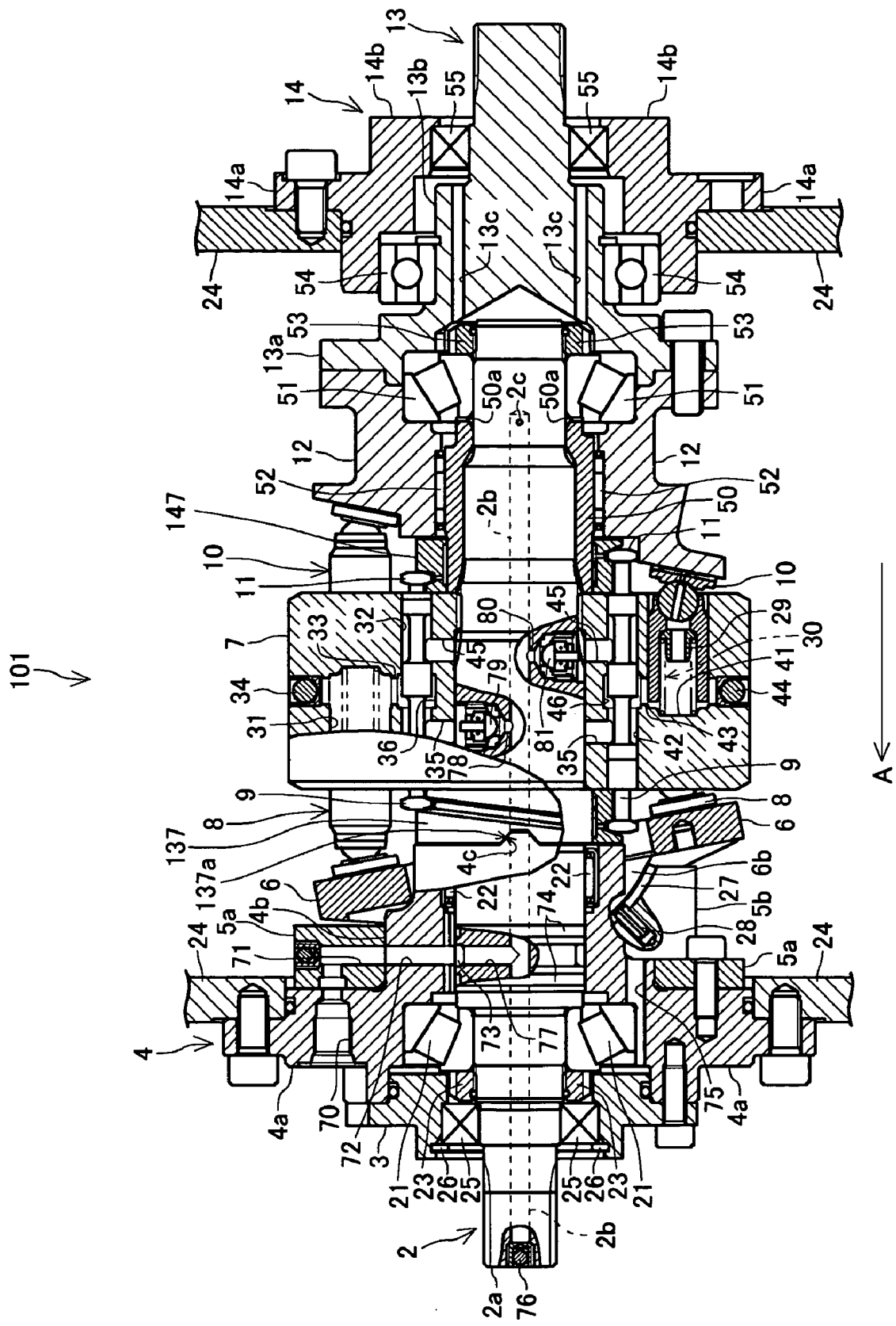
FIG. 19 is a sectional side view of the second embodiment of the hydraulic equipment.
Figure 20:
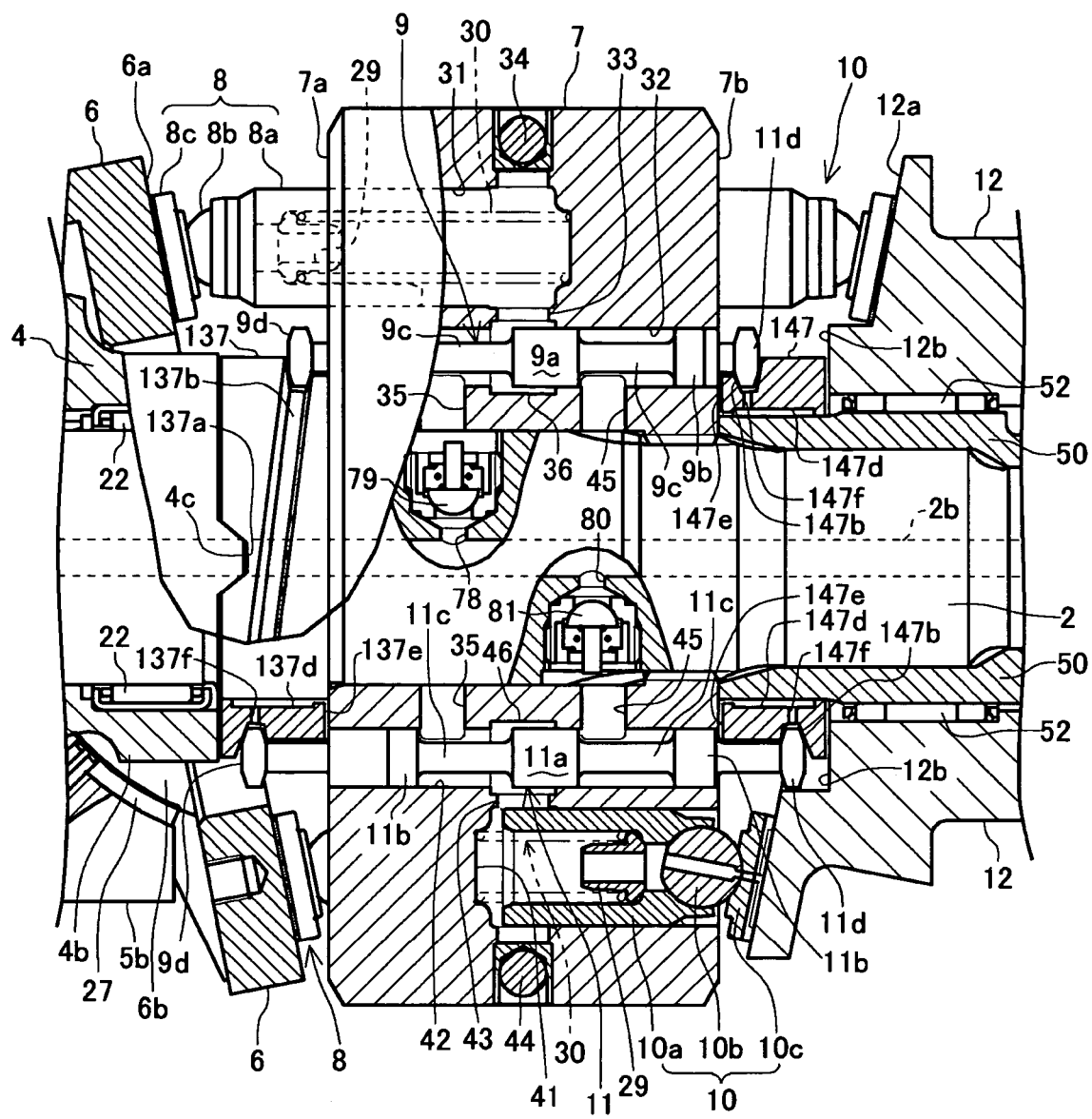
FIG. 20 is a sectional side view of the cylinder block of the hydraulic equipment of the second embodiment of the hydraulic equipment.
Figure 21:
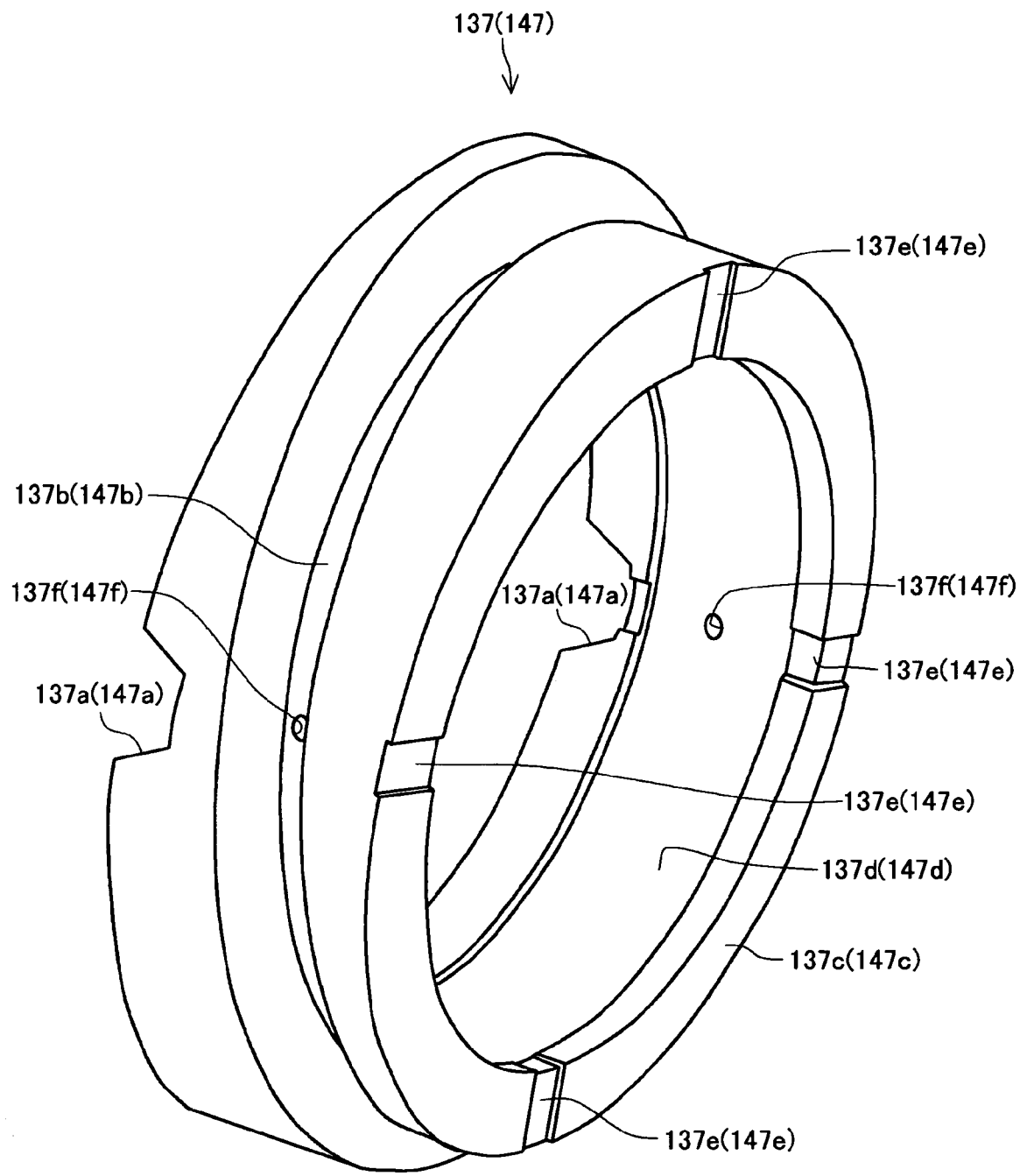
FIG. 21 is a perspective view of the spool valve guide of the second embodiment of the hydraulic equipment.
Figure 22:
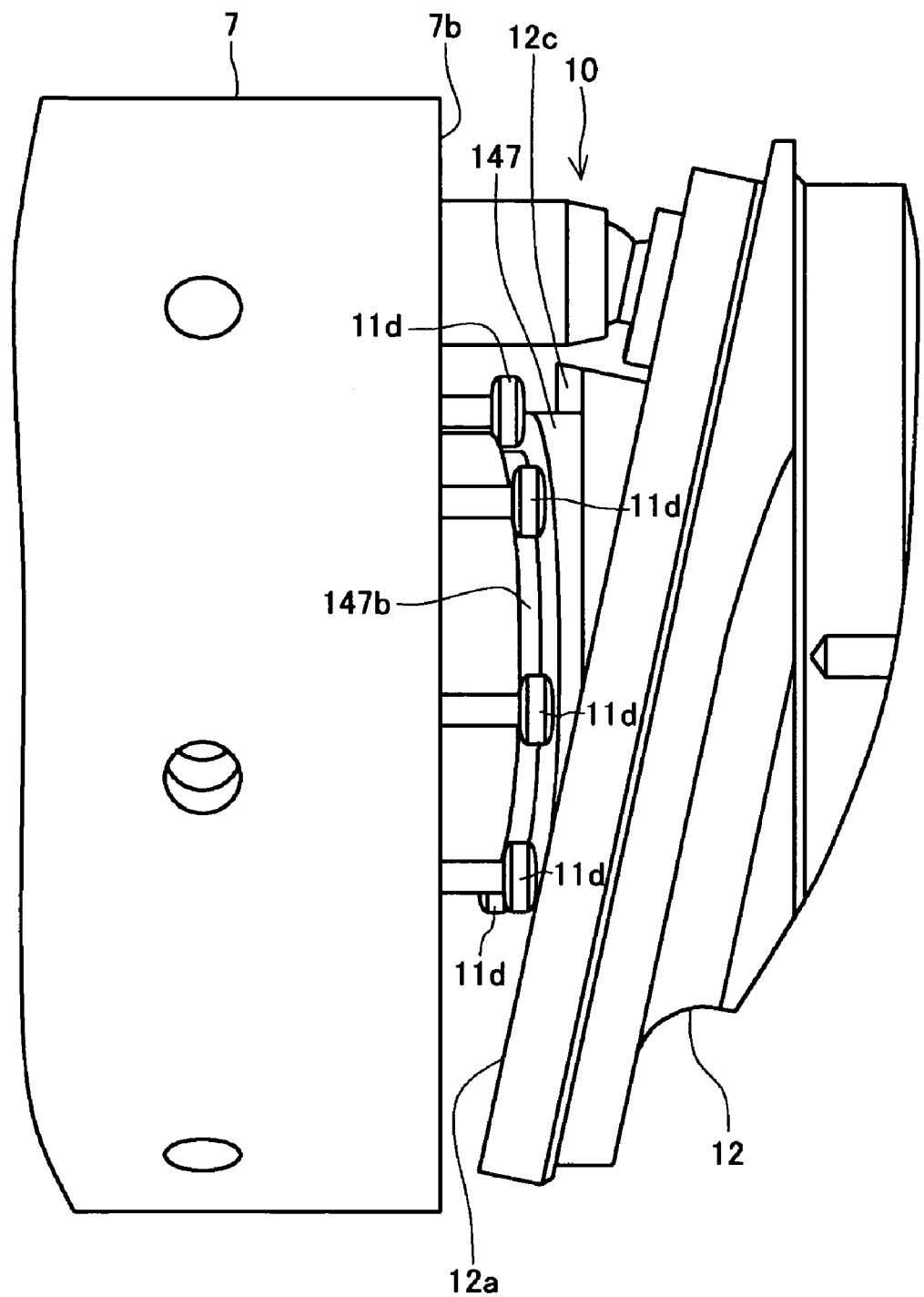
FIG. 22 is a side view of the principal part of the second embodiment of the hydraulic equipment.

The link arm 63 is L-like shaped when viewed in side. A rotary shaft 63a is projectingly provided from the bent part of the link arm 63. The rotary shaft 63a is rotatably attached to the transmission casing 24 or the like. In this case, an axial center 69 of the rotary shaft 63a is the same as an axis of a virtual rotational center 68 of the input side swash plate 6 rotated while touching the swash plate holding member 5 (to be exact, a little gap may exist therebetween as shown in FIGS. 17 and 18).

An engaging groove 63b is bored at one of ends of the link arm 63 which is closer to the rotary shaft 63a. The second arm engaging member 62 is slidably engaged with the engaging groove 63b. In this case, the engaging groove 63b is formed along a straight line connecting the rotary shaft 63a and one of ends of the link arm 63 closer to the rotary shaft 63a. Accordingly, the distance between the second arm engaging member 62 and the rotary shaft 63a is variable.

The second arm engaging member 62 is substantially rectangular parallelepiped, and the center thereof is bored thereon with a through-hole. The second engaging pin 66, which is projectingly provided on one of the holding parts 6b of the input side swash plate 6, is inserted into the through-hole.

On the other hand, the first engaging pin 65 is projectingly provided on the other end of the link arm 63 farther from the rotary shaft 63a. The first engaging pin 65 is rotatably inserted into the first arm engaging member 61.

The shape of the first arm engaging member 61 is substantially the same as the second arm engaging member 62. The first arm engaging member 61 is engaged with a notched groove 64a of the piston 64 and is slidable along the longer direction of the notched groove 64a.

The piston 64 is substantially cylindrical and is housed in a housing (not shown) so as to be slidable along the axial direction of the input shaft 2. The notched groove 64a is provided on the outer peripheral surface of the piston 64, and the longer direction of the notched groove 64a is substantially rectangular to the direction of reciprocal movement of the piston 64 (the axial direction of the input shaft 2).

The actuator 67 makes the piston 64 move reciprocally. More concretely, the actuator 67 is a hydraulic motor, a hydraulic cylinder, an electric motor, an air cylinder or the like.

When the piston 64 is moved reciprocally by the actuation of the actuator 67, the link arm 63, which is engaged with the outer peripheral surface of the piston 64 through the first arm engaging member 61 and the first engaging pin 65, is rotated centering on the rotary shaft 63a. Then, the input side swash plate 6, which is engaged with the link arm 63 through the second arm engaging member 62 and the second engaging pin 66, is rotated so as to change the slant angle thereof.

The holding parts 6b of the input side swash plate 6 are the rotational center of the input side swash plate 6 so as to rotate the input side swash plate 6 for changing the slant angle of the swash plate surface 6a of the input side swash plate 6. The holding parts 6b also bear the load along the axial direction of the input shaft 2 applied on the input side swash plate 6 by the input side plungers 8. The holding parts 6b are hemicylindrical, and the input side swash plate 6 is rotated through the link arm 63 while being held by the swash plate holding member 5.

However, with regard to this construction, it is necessary to make the rotational center of a virtual swash plate of the holding parts 6b in agreement with the axial center 69 of the rotary shaft 63a of the link arm 63, whereby high accuracy of assembly is required.

By constructing the distance between the second arm engaging member 62 and the rotary shaft 63a, the effect as discussed below is obtained, whereby a little gap between the virtual swash plate of the holding parts 6b and the axial center 69 of the rotary shaft 63a of the link arm 63 is permitted.

As shown in FIG. 17, in the case that the virtual rotational center 68 of the holding parts 6b of the input side swash plate 6 is not in agreement with the axial center 69 of the rotary shaft 63a of the link arm 63, when the input side swash plate 6 is rotated, an axial center 66a of the second engaging pin 66 projectingly provided on the holding parts 6b is moved along a circular arc-like locus 68a centering on the rotational center 68.

On the other hand, supposing that the link arm 63 is rotated while the distance between the second engaging pin 66 and the rotary shaft 63a is constant, the axial center 66a of the second engaging pin 66 is moved along a circular arc-like locus 69a centering on the axial center 69 of the rotary shaft 63a.

As shown in FIG. 17, when the virtual rotational center 68 of the holding parts 6b of the input side swash plate 6 is not in agreement with the axial center 69 of the rotary shaft 63a of the link arm 63, the locus 68a is not in agreement with the locus 69a.

In this case, if the distance between the second engaging pin 66 and the rotary shaft 63a is constant, the touching part between the input side swash plate 6 and the swash plate holding member 5 (the holding parts 6b and the metal bearing 27) may be separated or touch hardly excessively.

However, with regard to the construction that the second arm engaging member 62 is slidable along the engaging groove 63b provided at one of ends of the link arm 63 according to this embodiment, as shown in FIG. 18, the second arm engaging member 62 is slid along the engaging groove 63b so as to make the locus 68a in agreement with the locus 69a, whereby the above-mentioned problems are prevented.

It is difficult to make the virtual rotational center 68 of the holding parts 6b of the input side swash plate 6 in agreement with the axial center 69 of the rotary shaft 63a of the link arm 63 at the time of assembly work. However, by constructing as the link arm mechanism 60 in this embodiment, a little assembly error is permitted, thereby improving workability of the assembly.

Furthermore, the distance between the rotary shaft 63a of the link arm 63 and the second engaging pin 66 (variable) is shorter than the distance between the rotary shaft 63a of the link arm 63 and the first engaging pin 65 (constant) so that the power driving the piston 64 reciprocally is enlarged with the principle of the lever and changed into the power rotating the input side swash plate 6 (swash plate slanting torque) by the link arm 63. Accordingly, the driving force of the piston 64 for rotating the input side swash plate 6 can be reduced.

In this embodiment, the link arm 63 is L-like shaped when viewed in side. However, the construction is not limited thereto and the link arm 63 may be shaped straight or doglegged.

Namely, the link arm 63 is only necessary to have the first and second arms with the axial center 69 of the rotary shaft 63a as a fulcrum.

Hereinafter, explanation will be given in detail on a hydraulic stepless transmission 101, which is the second embodiment of the hydraulic equipment according to the present invention, according to FIGS. 19, 20, 21 and 22. In addition, the hydraulic stepless transmission 101 of this embodiment is widely used for varying the traveling driving force of a working vehicle (a tractor or the like). However, the use of the transmission is not limited thereto and the transmission also is available widely in each of industrial fields, such as industrial equipment or a vehicle.

The member having substantially the same construction and function as that of the hydraulic stepless transmission 1, which is the first embodiment of the hydraulic equipment according to the present invention, is designated by the same numeral. Explanation will be given in detail on the difference between the hydraulic stepless transmission 101 and the hydraulic stepless transmission 1, which is the first embodiment of the hydraulic equipment according to the present invention.

The difference between the hydraulic stepless transmission 101 and the hydraulic stepless transmission 1 is the construction of the input side spool valve guide and output side spool valve guide for the reciprocal movement of the input side spool valves 9 and the output side spool valves 11 along the axial direction of the input shaft 2.

Hereinafter, explanation will be given in detail on an input side spool valve guide 137 and an output side spool valve guide 147, which are the spool valve guides of the second embodiment of the hydraulic equipment according to the present invention, according to FIGS. 19, 20, 21 and 22.

In addition, in this embodiment, the shape of the input side spool valve guide 137 is the same as that of the output side spool valve guide 147 for the common use of these members. However, the construction is not limited thereto and the shape of the input side spool valve guide 137 may not be the same as that of the output side spool valve guide 147.

The input side spool valve guide 137 is formed by processing mechanically on outer and inner peripheral surfaces of a substantial cylindrical member variously. The input side spool valve guide 137 moves the input side spool valves 9 reciprocally in cooperation with the rotation of the input shaft 2 (the cylinder block 7). The input side spool valve guide 137 is freely fitted on the input shaft 2 and interposed between the rear end of the body part 4b of the input side bearing housing 4, which is a bearing member pivotally supporting the input shaft 2 being the first rotary shaft, and the input side end surface 7a of the cylinder block 7. At the touching surface between the input side spool valve guide 137 and the input side bearing housing 4, recesses 137a are formed on the input side spool valve guide 137, and the salients 4c are formed on the rear end surface of the body part 4b. By engaging the recesses 137a with the salients 4c, the input side spool valve guide 137 becomes not to be relatively rotatable against the input shaft 2. The salients 4c and the recesses 137a are substantially trapezoidal, and each of them has a surface which is slanted against the axis of the input shaft 2 (that is, which is not in parallel to a surface rectangular to the axis of the input shaft 2).

When the input side spool valve guide 137 pretends to be rotated following the rotation of the input shaft 2 and the cylinder block 7, the surfaces of the salients 4c and the recesses 137a, which are slanted against the axis of the input shaft 2, touch with each other so as to generate power pressing the input side spool valve guide 137 to touch the input side end surface 7a of the cylinder block 7.

Accordingly, at the time of actuating the hydraulic stepless transmission 101 (that is, at the time of rotating the input shaft 2), the input side spool valve guide 137 is prevented from being dragged with the cylinder block 7. Furthermore, since the input side spool valve guide 137 is always pressed to the input side end surface 7a of the cylinder block 7, the distance between a guide groove 137b formed on the input side spool valve guide 137 and the input side end surface 7a is maintained accurately.

In addition, substantially the same effect can be obtained by the construction that salients are formed on the input side spool valve guide 137 and recesses are formed on the input side bearing housing 4.

The ring-like guide groove 137b is formed on the outer peripheral surface of the input side spool valve guide 137. A virtual plane passing through the guide groove 137b is not rectangular to the axis of the input side spool valve guide 137 (which is substantially equal to the axis of the input shaft 2) and is slanted. Therefore, the distance between the guide groove 137b and a touching surface 137c, touching the cylinder block 7, according to the position of the guide groove 137b on the input side spool valve guide 137.

In addition, the touching surface 137c is rectangular to the axis of the input shaft 2. The guide groove 137b is engaged with the engaging parts 9d of the input side spool valves 9.

A pressure oil groove 137d is formed circumferentially on the inner peripheral surface of the input side spool valve guide 137. Supply grooves 137e are provided so as to supply pressure oil collected in the pressure oil groove 137d to the touching part between the touching surface 137c and the input side end surface 7a of the cylinder block 7 for rubricating the touching part.

Pressure oil holes 137f communicating the pressure oil groove 137d with the guide groove 137b are bored. By the pressure oil holes 137f, pressure oil collected in the pressure oil groove 137d rubricates the touching parts the guide groove 137b and between the input side spool valves 9, whereby the friction is prevented so as to maintain the accuracy of each member.

When the input shaft 2 makes one rotation relatively against the input side bearing housing 4 fixed to the transmission casing 24, the cylinder block 7 also makes one rotation relatively against the input side bearing housing 4. Accordingly, the input side spool valves 9 engaged with the guide groove 137b make one rotation around the outer peripheral surface of the input side spool valve guide 137 along the guide groove 137b. In this case, the virtual plane based on the guide groove 137b is not in parallel to the plane rectangular to the axis of the input shaft 2 and is slanted against the input shaft 2, whereby the input side spool valves 9 go and return once along the axial direction of the input shaft 2.

With regard to the input side spool valve guide 137, for maintaining the accuracy of the reciprocal movement (the projection amount) of the input side spool valves 9, high dimensional accuracy (or flatness) is only required of the touching surface 137c touching the input side end surface 7a of the cylinder block 7 and the guide groove 37b engaged with the engaging parts 9d of the input side spool valves 9. Accordingly, the manufacturing cost is reduced.

Furthermore, since the number of parts concerning to the accuracy of the reciprocal movement is reduced, the accumulation of manufacturing error is reduced (that is, the accuracy of the reciprocal movement is improved).

The output side spool valve guide 147 is formed by processing mechanically on outer and inner peripheral surfaces of a substantial cylindrical member variously. The output side spool valve guide 147 moves the output side spool valves 11 reciprocally in cooperation with the relative rotation of the input shaft 2 (the cylinder block 7) and the output shaft 13. The output side spool valve guide 147 is freely fitted on the front end of the outer peripheral surface of the spacer 50 rotated integrally with the input shaft 2 and interposed between a touching surface 12b of the output side swash plate 12, which is rotated integrally with the output shaft 13 being the second rotary shaft, and the output side end surface 7b of the cylinder block 7. At the touching surface between the output side spool valve guide 147 and the output side swash plate 12, recesses 147a are formed on the output side spool valve guide 147, and salients 12c are formed on the touching surface 12b formed at the front end of the output side swash plate 12. By engaging the recesses 147a with the salients 12c, the output side spool valve guide 147 becomes not to be relatively rotatable against the output side swash plate 12 and is rotated integrally with the output side swash plate 12. The salients 12c and the recesses 147a are substantially trapezoidal, and each of them has a surface which is slanted against the axis of the input shaft 2 (that is, which is not in parallel to a surface rectangular to the axis of the input shaft 2).

When the output side spool valve guide 147 pretends to be rotated relatively to the output side swash plate 12 following the rotation of the input shaft 2 and the cylinder block 7, the surfaces of the salients 12c and the recesses 147a, which are slanted against the axis of the input shaft 2, touch with each other so as to generate power pressing the output side spool valve guide 147 to touch the output side end surface 7b of the cylinder block 7.

Accordingly, at the time of actuating the hydraulic stepless transmission 101 (that is, at the time of rotating the input shaft 2 and the output shaft 13), the output side spool valve guide 147 is prevented from being dragged with the cylinder block 7. Furthermore, since the output side spool valve guide 147 is always pressed to the output side end surface 7b of the cylinder block 7, the distance between a guide groove 147b formed on the output side spool valve guide 147 and the output side end surface 7b is maintained accurately.

In addition, substantially the same effect can be obtained by the construction that salients are formed on the output side spool valve guide 147 and recesses are formed on the output side swash plate 12.

The ring-like guide groove 147b is formed on the outer peripheral surface of the output side spool valve guide 147. A virtual plane passing through the guide groove 147b is not rectangular to the axis of the output side spool valve guide 147 (which is substantially equal to the axis of the input shaft 2) and is slanted. Therefore, the distance between the guide groove 147b and a touching surface 147c, touching the cylinder block 7, according to the position of the guide groove 147b on the output side spool valve guide 147.

In addition, the touching surface 147c is rectangular to the axis of the input shaft 2. The guide groove 147b is engaged with the engaging parts 11d of the output side spool valves 11.

A pressure oil groove 147d is formed circumferentially on the inner peripheral surface of the output side spool valve guide 147. Supply grooves 147e are provided so as to supply pressure oil collected in the pressure oil groove 147d to the touching part between the touching surface 147c and the output side end surface 7b of the cylinder block 7 for rubricating the touching part.

Pressure oil holes 147f communicating the pressure oil groove 147d with the guide groove 147b are bored. By the pressure oil holes 147f, pressure oil collected in the pressure oil groove 147d rubricates the touching parts between the guide groove 147b and the output side spool valves 11, whereby the friction is prevented so as to maintain the accuracy of each member.

When the output shaft 13 makes one rotation relatively against the input shaft 2, the output shaft 13 also makes one rotation relatively against the cylinder block 7. Accordingly, the output side spool valves 11 engaged with the guide groove 147b make one rotation around the outer peripheral surface of the output side spool valve guide 147, which is not rotatable relatively against the output shaft 13, along the guide groove 147b. In this case, the virtual plane based on the guide groove 147b is not in parallel to the plane rectangular to the axis of the input shaft 2 and is slanted against the input shaft 2, whereby the output side spool valves 11 go and return once along the axial direction of the input shaft 2.

With regard to the output side spool valve guide 147, for maintaining the accuracy of the reciprocal movement (the projection amount) of the output side spool valves 11, high dimensional accuracy (or flatness) is only required of the touching surface 147c touching the output side end surface 7b of the cylinder block 7 and the guide groove 147b engaged with the engaging parts 11d of the output side spool valves 11. Accordingly, the manufacturing cost is reduced.

Furthermore, since the number of parts concerning to the accuracy of the reciprocal movement is reduced, the accumulation of manufacturing error is reduced (that is, the accuracy of the reciprocal movement is improved).

As the above mentioned, the hydraulic stepless transmission 101, which is the first embodiment of the hydraulic equipment of the present invention, comprises the input shaft 2 which is the first rotary shaft, the output shaft 13 which is the second rotary shaft, the input side plungers 8 which are the first plungers and the output side plungers 10 which are the second plungers moved reciprocally axially, the input side spool valves 9 which are the first spool valves and the output side spool valves 11 which are the second spool valves also moved reciprocally axially, the cylinder block 7 which houses the input side plungers 8, the output side plungers 10, the input side spool valves 9 and the output side spool valves 11 and is rotated integrally with the first rotary shaft 2, the input side swash plate 6 which is the first swash plate and touches the input side plungers 8 at the swash plate surface 6a changeable its slant angle against the axis of the rotary shaft, and the output side swash plate 12 which is the second swash plate and touches the output side plungers 10 at the swash plate surface 12a having the fixed slant angle against the axis of the rotary shaft and is rotated integrally with the output shaft 13. The hydraulic circuit is formed in the cylinder block 7 so as to communicate the input side plunger holes 31 in which the first plungers are housed with the output side plunger holes 41 in which the second plungers are housed. The passage of pressure oil flowing into or out from the input side plunger holes 31 in which the input side plungers 8 are housed is switched by the input side spool valves 9. The passage of pressure oil flowing into or out from the output side plunger holes 41 in which the output side plungers 10 are housed is switched by the output side spool valves 11. The hydraulic stepless transmission 101 has a pair of the spool valve guides comprising the input side spool valve guide 137 on which the guide groove 137b displaced along the axial direction of the rotary shaft is formed and the output side spool valve guide 147 on which the guide groove 147b also displaced along the axial direction of the rotary shaft is formed. The input side spool valves 9 are engaged with the input side holder 38 which is a holding member attached to the guide groove 137b. The output side spool valves 11 are engaged with the output side holder 48 which is a holding member attached to the guide groove 147b.

According to this construction, number of the members is reduced to which high dimensional accuracy is required for maintaining the accuracy of the axial reciprocal movement of the input side spool valves 9 and the output side spool valves 11 (in this embodiment, the input side spool valve guide 137, the output side spool valve guide 147 and the cylinder block 7), whereby the manufacturing cost is reduced.

The input side spool valve guide 137 and the cylinder block 7 touch with each other by their surfaces facing mutually (that is, the touching surface 137*c* and the input side end surface 7*a*). The output side spool valve guide 147 and the cylinder block 7 touch with each other by their surfaces facing mutually (that is, the touching surface 147*c* and the output side end surface 7*b*). These surfaces facing mutually are rectangular to the axis of the input shaft 2. Accordingly, by processing the surfaces facing mutually with high accuracy, the accuracy of the axial reciprocal movement of the input side spool valves 9 and the output side spool valves 11*c* an be obtained easily, whereby the members can be manufactured easily so as to reduce the manufacturing cost.

Furthermore, the recesses 137*a* and the salients 4*c* or the recesses 147*a* and the salients 12*c*, which are engaged with each other at their surfaces slanted against the surface rectangular to the axis of the input shaft 2, are formed in the part at which the input side spool valve guide 137 being one of the spool valve guides touches the bearing member pivotally supporting the input shaft 2 (in this embodiment, the input side bearing housing 4) or the part at which the output side spool valve guide 147 being the other spool valve guide touches the member rotated integrally with the output shaft 13 (in this embodiment, the output side swash plate 12). Accordingly, the input side spool valve guide 137 and the output side spool valve guide 147 are applied thereto with power respectively toward the input side end surface 7*a* and the input side end surface 7*b* of the cylinder block 7.

Therefore, by processing with high accuracy the surfaces by which the input side spool valve guide 137 and the output side spool valve guide 147 touch the cylinder block 7 (that is, the touching surface 137*c*, the touching surface 147*c*, the input side end surface 7*a* and the input side end surface 7*b*), the accuracy of the axial reciprocal movement of the input side spool valves 9 and the output side spool valves 11*c* an be maintained easily, whereby the members can be manufactured easily so as to reduce the manufacturing cost.

Contrary to the input side spool valve guide 37 and the output side spool valve guide 47 which are the spool valve guides of the first embodiment of the present invention, with regard to the input side spool valve guide 137 and the output side spool valve guide 147 which are the spool valve guides of the second embodiment of the present invention, the engaging parts 9*d* of the input side spool valves 9 are directly engaged with the guide groove 137*b*, and the engaging parts 11*d* of the output side spool valves 11 are directly engaged with the guide groove 147*b*. Accordingly, the input side holder 38, the input side holder presser 39, the output side holder 48 and the output side holder presser 49 in the input side spool valve guide 37 and the output side spool valve guide 47 can be omitted so as to reduce the manufacturing cost further.

With regard to this embodiment, the guide grooves 137*b* and 147*b* are arranged on the virtual plane slanted against the input shaft 2, but the application of the present invention is not limited thereto. For example, it may be constructed that the axial displacement of the groove is large at the first half and small at the latter half in the case that the spool valve is moved from the bottom dead point to the top dead point, and the axial displacement of the groove is small at the first half and large at the latter half in the case that the spool valve is moved from the top dead point to the bottom dead point. The shape of the grooves can be selected suitably corresponding to the driving characteristics of the hydraulic equipment.

With regard to this embodiment, the first rotary shaft is set to the input shaft 2 and the second rotary shaft is set to the output shaft 13, but the application of the present invention is not limited thereto. It may be constructed that the first rotary shaft is set to the output shaft and the second rotary shaft is set to the input shaft.

In addition, in this case, the relation between the rotation speed Nout of the first rotary shaft as the output shaft and the rotation speed Nin of the second rotary shaft as the input shaft is explained by a formula written by replacing Nout with Nin in the Formula 4. Namely, the formula is "Nout=Nin*Vin/(Vin+Vout)". Herein, Vin is the stroke volume of the plunger touching the fixed swash plate. If Vin is set to be constant and Vout, which is the stroke volume of the plunger touching the movable swash plate, is changed within the range "−Vin≦Vout≦Vin", the relation "(½)*

$Nin \leq Nout < +\infty$" is materialized theoretically.

INDUSTRIAL APPLICABILITY

In addition to the speed variation of the traveling driving force of a working vehicle (a tractor or the like), the hydraulic stepless transmission according to the present invention also is available widely in varying the traveling driving force of industrial equipment or another vehicle.

The invention claimed is:

1. Hydraulic equipment comprising:
   a first rotary shaft and a second rotary shaft;
   first and second plungers which are moved reciprocally axially;
   first and second spool valves which are also moved reciprocally axially; a cylinder block which houses the first and second plungers and the first and second spool valves and is rotated integrally with the first rotary shaft; a first swash plate which touches the first plungers; and
   a second swash plate which touches the second plungers and is rotated integrally with the second rotary shaft, wherein
   a hydraulic circuit is formed in the cylinder block so as to communicate holes in which the first plungers are housed with holes in which the second plungers are housed, and
   a passage of pressure oil flowing into or out from the plunger holes in which the first plungers are housed is switched by the first spool valves, and a passage of pressure oil flowing into or out from the plunger holes in which the second plungers are housed is switched by the second spool valves,
   characterized in that
   a spool valve guide on which a guide groove slanted against an axis of the rotary shaft is formed, and the first or second spool valve is engaged with a holding member attached to the guide groove.

2. Hydraulic equipment as set forth in claim 1, wherein the spool valve guide and the cylinder block touch with each other by their surfaces facing mutually.

3. Hydraulic equipment as set forth in claim 2, wherein a member is provided which is engaged with the spool valve guide in a convex-concave way from an opposite side of the cylinder block.

4. Hydraulic equipment as set forth in claim 3, further comprising:

first and second inner peripheral grooves formed on an inner peripheral surface of a through-hole bored on the cylinder block for the first rotary shaft;

spool valve holes in which the first and second spool valves are housed; and the hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively in an axial direction than a position at which the first or second inner peripheral groove is communicated with the spool valve hole, and the radial extended part at the middle portion of the first or second spool valve is arranged at the confluence part communicating the plunger hole with the spool valve hole.

5. Hydraulic equipment as set forth in claim 2, further comprising:

first and second inner peripheral grooves formed on an inner peripheral surface of a through-hole bored on the cylinder block for the first rotary shaft;

spool valve holes in which the first and second spool valves are housed; and the hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively in an axial direction than a position at which the first or second inner peripheral groove is communicated with the spool valve hole, and the radial extended part at the middle portion of the first or second spool valve is arranged at the confluence part communicating the plunger hole with the spool valve hole.

6. Hydraulic equipment as set forth in claim 1, further comprising:

first and second inner peripheral grooves formed on an inner peripheral surface of a through-hole bored on the cylinder block for the first rotary shaft;

spool valve holes in which the first and second spool valves are housed; and the hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively in an axial direction than a position at which the first or second inner peripheral groove is communicated with the spool valve hole, and the radial extended part at the middle portion of the first or second spool valve is arranged at the confluence part communicating the plunger hole with the spool valve hole.

7. Hydraulic equipment comprising:

a first rotary shaft and a second rotary shaft;

first and second plungers which is moved reciprocally axially;

first and second spool valves which is also moved reciprocally axially;

a cylinder block which houses the first and second plungers and the first and second spool valves and is rotated integrally with the first rotary shaft;

a first swash plate which touches the first plungers; and a second swash plate which touches the second plungers and is rotated integrally with the second rotary shaft, wherein a hydraulic circuit is formed in the cylinder block so as to communicate holes in which the first plungers are housed with holes in which the second plungers are housed, and a passage of pressure oil flowing into or out from the plunger holes in which the first plungers are housed is switched by the first spool valves, and a passage of pressure oil flowing into or out from the plunger holes in which the second plungers are housed is switched by the second spool valves, characterized in that a spool valve guide on which a guide groove displaced along an axial direction of the rotary shaft is formed is provided, and the first or second spool valve is engaged with a holding member attached to the guide groove, wherein the spool valve guide and the cylinder block touch with each other by their surfaces facing mutually.

8. Hydraulic equipment as set forth in claim 7, wherein a member is provided which is engaged with the spool valve guide in a convex-concave way from an opposite side of the cylinder block.

9. Hydraulic equipment as set forth in claim 8, further comprising:

first and second inner peripheral grooves formed on an inner peripheral surface of a through-hole bored on the cylinder block for the first rotary shaft;

spool valve holes in which the first and second spool valves are housed; and the hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively on axial direction than a position at which the first or second inner peripheral groove is communicated with the spool valve hole, and the radial extended part at the middle portion of the first or second spool valve is arranged at the confluence part communicating the plunger hole with the spool valve hole.

10. Hydraulic equipment as set forth in claim 7, further comprising:

first and second inner peripheral grooves formed on an inner peripheral surface of a through-hole bored on the cylinder block for the first rotary shaft;

spool valve holes in which the first and second spool valves are housed; and the hydraulic circuit comprising the first and second inner peripheral grooves, the plunger holes in which the first and second plungers are housed, and the spool valve holes, wherein the first or second spool valve comprises radial extended parts, arranged at both ends and middle portion thereof and whose outer diameter is substantially the same as a diameter of the spool valve holes, and valve stems, communicating the radial extended parts with each other and whose outer diameter is smaller than that of the radial extended parts, an inner diameter of each of the spool valve holes at a confluence part thereof with a communication oil passage communicating the plunger hole with the spool valve hole is enlarged, the radial extended parts at both ends of the first or second spool valve are arranged closer to both end surfaces of the cylinder block respectively on axial direction than a position at which the first or second inner peripheral groove is communicated with the spool valve hole, and the radial extended part at the middle portion of the first or second spool valve is arranged at the confluence part communicating the plunger hole with the spool valve hole.

\* \* \* \* \*